United States Patent
Mahany

(10) Patent No.: US 7,609,747 B2
(45) Date of Patent: *Oct. 27, 2009

(54) RADIO FREQUENCY COMMUNICATION NETWORK HAVING ADAPTIVE COMMUNICATION PARAMETERS

(75) Inventor: Ronald L. Mahany, Cedar Rapids, IA (US)

(73) Assignee: Broadcom Corporation, Irvine, CA (US)

( * ) Notice: Subject to any disclaimer, the term of this patent is extended or adjusted under 35 U.S.C. 154(b) by 451 days.

This patent is subject to a terminal disclaimer.

(21) Appl. No.: 11/112,634

(22) Filed: Apr. 22, 2005

(65) Prior Publication Data

US 2005/0195859 A1    Sep. 8, 2005

Related U.S. Application Data

(63) Continuation of application No. 10/996,643, filed on Nov. 22, 2004, which is a continuation of application No. 10/360,591, filed on Feb. 6, 2003, which is a continuation of application No. 09/799,340, filed on Mar. 5, 2001, now abandoned, which is a continuation of application No. 09/123,876, filed on Jul. 28, 1998, now abandoned, which is a continuation of application No. 08/476,550, filed on Jun. 6, 1995, now Pat. No. 5,862,171, which is a continuation of application No. 08/270,107, filed on Jun. 30, 1994, now Pat. No. 5,425,051, which is a continuation of application No. 07/973,237, filed on Nov. 9, 1992, now abandoned.

(51) Int. Cl.
*H04B 1/69* (2006.01)
(52) U.S. Cl. .................. 375/130; 455/62; 455/423; 455/67.11

(58) Field of Classification Search .............. 375/130, 375/358, 219, 140, 132; 455/69, 70, 72, 455/423, 62, 67.11, 134, 139
See application file for complete search history.

(56) References Cited

U.S. PATENT DOCUMENTS 3,745,464 A    7/1973    Lee (Continued)

FOREIGN PATENT DOCUMENTS

EP        0 353 759        2/1990

(Continued)

OTHER PUBLICATIONS

Defendant And Counterclaim Plaintiff Qualcomm Incorporated's Final Invalidity Contentions, With Exhibit A, Nov. 21, 2006.

(Continued)

*Primary Examiner*—Temesghen Ghebretinsae
(74) *Attorney, Agent, or Firm*—McAndrews, Held & Malloy, Ltd.

(57) ABSTRACT

Improved apparatus for a radio communication network having mobile transceiver units in communication with base transceiver units. The radio communication network is adaptive in that in order to compensate for the wide range of operating conditions, a set of variable network parameters are adapted for communication between transceivers in the network. These parameters may, for example, define optimized communication on the network under current network conditions. Examples of such parameters may include, without limitation: packet size, data rate, type of modulation, type or degree of error correction coding and spread spectrum communication parameters.

60 Claims, 13 Drawing Sheets

U.S. PATENT DOCUMENTS

| | | | |
|---|---|---|---|
| 4,047,151 | A | 9/1977 | Rydbeck et al. |
| 4,069,392 | A | 1/1978 | Goldenberg et al. |
| 4,309,764 | A | 1/1982 | Acampora |
| 4,355,399 | A | 10/1982 | Timor |
| 4,495,619 | A | 1/1985 | Acampora |
| 4,578,820 | A | 3/1986 | Highton |
| 4,611,181 | A | 9/1986 | Fukumura et al. |
| 4,620,114 | A | 10/1986 | Moon |
| 4,639,914 | A | 1/1987 | Winters |
| 4,672,658 | A | 6/1987 | Kavehrad |
| 4,675,863 | A | 6/1987 | Paneth et al. |
| 4,691,314 | A * | 9/1987 | Bergins et al. .............. 370/471 |
| 4,701,923 | A | 10/1987 | Fukasawa et al. |
| 4,720,829 | A | 1/1988 | Fukasawa et al. |
| 4,784,450 | A | 11/1988 | Jain |
| 4,785,450 | A | 11/1988 | Bolgiano |
| 4,789,983 | A | 12/1988 | Acampora |
| 4,809,257 | A | 2/1989 | Gantenbein et al. |
| 4,817,089 | A | 3/1989 | Paneth |
| 4,890,332 | A | 12/1989 | Takahashi |
| 4,910,794 | A | 3/1990 | Mahany |
| 4,930,140 | A | 5/1990 | Cripps |
| 4,931,250 | A | 6/1990 | Grezczuk |
| 4,939,731 | A | 7/1990 | Reed |
| 4,984,247 | A | 1/1991 | Kaufmann |
| 5,029,183 | A | 7/1991 | Tymes |
| 5,054,111 | A | 10/1991 | Goodwin |
| 5,056,109 | A | 10/1991 | Gilhousen et al. |
| 5,101,406 | A | 3/1992 | Messenger |
| 5,103,459 | A | 4/1992 | Gilhousen et al. |
| 5,117,504 | A | 5/1992 | Dennerlein et al. |
| 5,142,550 | A | 8/1992 | Tymes |
| 5,191,583 | A * | 3/1993 | Pearson et al. .............. 370/242 |
| 5,197,061 | A | 3/1993 | Halbert-Lassalle et al. |
| 5,204,876 | A | 4/1993 | Bruckert et al. |
| 5,235,614 | A | 8/1993 | Bruckert |
| 5,278,866 | A | 1/1994 | Nonami |
| 5,282,222 | A | 1/1994 | Fattouche et al. |
| 5,321,721 | A | 6/1994 | Yamaura |
| 5,414,796 | A | 5/1995 | Jacobs et al. |
| 5,425,051 | A | 6/1995 | Mahany |
| 5,577,087 | A | 11/1996 | Furuya |
| 5,657,317 | A | 8/1997 | Mahany et al. |
| 5,708,680 | A | 1/1998 | Gollnick |
| 6,285,865 | B1 | 9/2001 | Vorenkamp et al. |
| 6,389,010 | B1 | 5/2002 | Kubler et al. |
| 6,847,686 | B2 | 1/2005 | Morad et al. |

FOREIGN PATENT DOCUMENTS

| | | |
|---|---|---|
| JP | 59-39150 | 3/1984 |
| JP | 62-281533 | 12/1987 |
| JP | 63-141432 | 6/1988 |
| JP | 63-184420 | 7/1988 |
| JP | 63-252047 | 10/1988 |
| JP | 64-51838 | 2/1989 |
| JP | 1-122241 | 5/1989 |
| JP | 1-122242 | 5/1989 |
| JP | 1-149627 | 6/1989 |
| JP | 1-170147 | 7/1989 |
| JP | 2-35848 | 2/1990 |
| JP | 3-60251 | 3/1991 |
| WO | WO 90/13187 | 11/1990 |

OTHER PUBLICATIONS

Antonio et al., "OmniTRACS: A Commercial Ku-Band Mobile Satellite Terminal And Its Applicability To military Mobile Terminals," MOLCOM 88, 1988 IEEE Military Communications Confernece, Oct. 23-26, 1988.

Filip et al., "Adaptive Modulation As A Fade Countermeasure: An Olympus Experiment," International Journal Of Satellite Communications, vol. 8, pp. 31-41, Jan. 1990.

Fralick et al., "Technological Considerations for Packet Radio Networks", AFIPS Conference Proceedings, 1975 National Computer Conference, May 19-22, 1975.

Goodman et al., "Combined Source And Channel Coding For Matching The Speech Transmission Rate To The Quality Of The Channel", GLOBECOM '83, IEEE Global Telecommun. Conf, IEEE 1982, vol. 1, pp. 316-321.

Goodman et al., "Combined Source And Channel Coding For Variable-Bit-Rate Speech Transmission", The Bell System Technical Journal, vol. 62, No. 7, Sep. 1983.

Goodman et al., "Quality of Service And Bandwith Efficiency Of Cellular Mobile Radio With Variable Bit-Rate Speech Transmission," IEEE Trans. On Vehicular Technology, Aug. 1983, vol. VT-32, No. 3, pp. 211-217.

Goodman et al., "Transmission Errors And Forward Error Correction In Embedded Differential Pulse Code Modulation," Bell System Technical Journal, vol. 62, No. 9, Nov. 1983.

Goodman, "Embedded DPCM For Variable Bit Rate Transmission," IEEE Trans. On Communications, vol. COM-28, No. 7, pp. 1040-1046, Jul. 1980.

Goodman, "Quality Of Service And Bandwidth Efficiency Of Cellular Mobile Radio With Variable-Bit-Rate Speech Transmission", $33^{rd}$ IEEE Vehicular Technology Conference, IEEE 1983, pp. 316-321.

Hansson et al., "Multilevel Frequency Modulation In Mobitex", Diploma Thesis, Dept. of Information Theory, Chalmers Univ. of Tech., Sep. 1991 (Swedish article; English translation of abstract only).

Henry et al., "HF Radio Data Communication", Communications Quarterly, Spring 1992, pp. 11-24.

Hughes et al., "The Use Of Spread-Spectrum Coding As A Fading Countermeasrue At 20/30 Hz", ESA Journal, vol. 11, No. 4, 1987.

Jacobs et al., "The Application Of A Novel Two-Way Mobile Satellite Communications And Vehicle Tracking System To The Transportation Industry", IEEE Transactions On Vehicular Technology, vol. 40, Issue No. 1, Feb. 1991, pp. 57-63.

Jakes, Microwave Mobile Communications, 1974, Ch. 1., Multipath Interference, pp. 11-78.

Kahn et al., "Advances In Packet Radio Technology", IEEE, vol. 66, No. 11, Nov. 1978, pp. 1468-1496.

Petit, "The Cloverleaf Performance-Oriented HF Data Communication System," $9^{th}$ Computer Networking Conference, Sep. 22, 1990, pp. 191-194.

Steele et al., "Variable Rate QAM For Data Transmission Over Rayleigh FadingChannels," Keynote Paper, Wireless '91, The Third National Seminar & Workshop On Wireless Personal Communications, Calgary, Alberta, Jul. 9, 1991, pp. 1-14.

Steele., "Deploying Personal Communication Networks", IEEE Communications Magazine, Sep. 1990, pp. 12-15.

Tomlinson et al., "Fade Countermeasures at Ka Band: Direct Inter-Establishment Communications Equipment (Dice)", Electronics Division Colloquium on Results Of Experiments Using The Olympus Satellite, Dec. 17, 1993, pp. 4/1-4/6.

Web, "QAM: The Modulation Scheme For Future Mobile Radio Communications?", Electronics & Communication Engineering Journal, Aug. 1992, pp. 167-176.

Ziemer et al., "Principles Of Communications, System, Modulation And Noise", 1976, pp. 93, 135, 160, 154.

Gibilisco et al., Encyclopedia of Electronics, $2^{nd}$ edition, 1990, p. 697.

OmniTRACS system, invented and sold by Qualcomm, first sold at least as early as Oct. 12, 1988 to Schneider National, Inc. (B-18).

Darpa packet radio network, in public use prior to Nov. 9, 1991 (B-26).

Clover-I and Clover-II Systems, invented by Raymond Petit and in public use prior to Nov. 9, 1992.

Dixon, Spread Spectrum Systems, $2^{nd}$ ed., 1984, p. 9, 13, 19-20, 25-26, 58, 84-89, 91-98.

Korn, Digital Communications, Chapters 2, 3, and 12, 1985.

Lee et al., Digital Communications, pp. 214-217, 426-439, 1988.

Kimon et al., "Differential Detection of Gaussian MSK in a Mobile Radio Environment", IEEE Trans. On Vehicular Tech., vol. VT-33, No. 4, Nov. 1984, pp. 307-320.

Murota et al., "Dual Rate Mobile Data System", IEEE International Symposium on Personal Indoor and Mobile Raido Communications, pp. 520-524, Oct. 19-21, 1992.

Fifer et al., "The Low Cost Packet Radio", IEEE Proceedings, vol. 75, No. 1, pp. 33-43, Jan. 1987.

Fischer et al., "Wide-Band Packet Radio For Multipath Environments", IEEE Transactions On Communications, vol. 36, No. 5, pp. 564-576, May 1988.

Fischer et al., "Wide-Band Packet Radio Technology", IEEE Proceedings, vol. 75, No. 1, pp. 100-115, Jan. 1987.

Jacobs, et al., "General Purpose Packet Satellite Networks", IEEE Proceedings, vol. 66, No. 11, pp. 1448-1467, Nov. 1978.

Jacobsmeyer J., "Adaptive Trellis Coded Modulation For Bandlimited Meteor Burst Channels", IEEE Journal on Selected Areas In Communications, vol. 10, No. 3, pp. 550-561, Apr. 1992.

Jacobsmeyer J., "Adaptive Information Rate Performance On Bandlimited Meteor Burst Channels: Empirical Results", Ninth Annual International Phoenix Conference On Computer and Communications, pp. 254-261, Mar. 21-23, 1990.

Jacobsmeyer J., Adaptive Trellis Coded Modulation For Bandlimited Meteor Burst Channels, Military Communications Conferences, MILCOM 89, Conference Record, Bridging the Gap. Interoperability, Survivability, Security, pp. 418-422, Oct. 15-18, 1989.

Jacobsmeyer J., An Adaptive Modulation Scheme For Bandwith-Limited Meteor-Burst Channels, Military Communications Conference, MILCOM 88, Conference Record, $21^{st}$ Century Military Communications—What's Possible?, pp. 933-937, Oct. 23-26, 1988.

Massoumi, S. et al., "Adaptive Trellis Coded Modulation For Mobile Communications", IEEE Pacific Rim Conference on Communications, computers and signal Processing, pp. 538-541, May 9-10, 1991.

Snytkin, I., Adaptive Communications Systems Employing Spread-Spectrum Signals Based On Nonlinear Recurrent Sequences, Telecommunications and Radio Engineering, Scripta Technica, Inc., vol. 46, No. 3, pp. 161-162, Mar. 1991.

CCITT Recommendation V.32bis, A Duplex Modem Operating At Data Signaling Rates Of Up To 14 400 bit/s For Use On The General Switched Telephone Network And on Leased Point-To-Point 2-Wire Telephone-Type Circuits (Study Group XVI1) Feb. 22, 1991.

CCITT Recommendation V.32, A Family Of 2-Wire, Duplex Modems Operating At Data Signaling Rates Of Up To 9600 bit/s For Use On The General Switched Telephone Network And On Leased Telephone-Type Circuits-Data Communication Over The Telephone Network-Study Group XVII, pp. 234-251, Jan. 1, 1989.

Viterbi at al., "A Pragmatic Approach To Trellis-Coded Modulation", IEEE Communications Magazine, pp. 11-19, Jul. 1989.

Viterbi et al., "Trellis-Coded MPSK Modulation For Highly Efficient Military Satellite Applications", Military Communications Conference, MILCOM 88, "21st Century Military Communications—What's Possible?", pp. 647-651, Oct. 23-26, 1988.

Weitzen J., et al., "A High Speed Digital Modem For The Meteor Scatter Channel", Proceedings Of The Seventeenth Annual Conference On Information Sciences And Systems, p. 344-349, Mar. 23-25, 1983.

Hansson U., et al., "Dual Rate Mobile Data System", IEEE International Symposium On Personal Indoor And Mobile Radio Communications, pp. 520-524, Oct. 19-21, 1992.

Jubin et al., "The DARPA Packet Radio Network Protocols", IEEE Proceedings, vol. 75, No. 1, pp. 21-32, Jan. 1987.

Amended Preliminary Invalidity Contentions with Exhibit C, Feb. 21, 2006.

Norand History, 1989.

Norand CA5950 Communications Adapter Specifications, 1991.

Norand Data Collection System: 7527 Emulation Products, Technical Overview, Edition 1.0, Sep. 1991.

Norand 1000 Series Modular RF Terminals, The Family Of Terminals That Fits Your Needs, 1993.

Norand 1000 Series Systems, A Breakthrough Flexibility For Pocket RF, 1991.

Norand RT/DT 1100 Radio Data Terminal, Compact, Pocket-Sized Terminal Offers Scanning And Memory Capabilities Simply By Changing Modules, 1992.

Norand 3000 Series Radio Data Terminal User's Guide, NPN:961-047-017, Jul. 1990.

Intermec RT 5900 Mobile-Mount Terminal Specification, Aug. 2, 2000.

Intermec Hand-Held Terminals Product Profile, 1700 Series, 1990.

Gollnick, Norand, Models RC3250 & RC3240 RF Network Controllers 225-445-XXX, Theory Of Operation, Document No. 561-014-035, Revision: A, Dec. 16, 1991.

Norand RC3240/RC3250 Network Controller, Service Instruction Book, 980-000-095, $1^{st}$ Edition, Mar. 1992.

Defendant Qualcomm Incorporated's Second Supplemental Responses To Plaintiff Broadcom Corporation's First Set Of Interrogatories (Nos. 1-19), Mar. 1, 2006.

Ali et al., "Interference Rejection in Direct-Sequence Spread Spectrum by Chip-Code Processing," IEEE International Symposium, King's College, University of London, England, Sep. 1990.

Allpress, et al., "An Investigation of RAKE Receiver Operation in an Urban Environment for Various Spreading Bandwidth Allocations," Feb. 1992, pp. 506-510.

Ananasso, et al., Satellite Applications of Spread Spectrum Frequency Hopping Techniques, 1989 IEEE.

Ayers, "Selection of a Forward Error Correcting Code for the Data Communication Radio Link of the Advanced Train Control System," 1990, IEEE Transactions on Vehicular Technology, p. 247-54.

Bausbacher, "Transmission Parameter Selection in an Adaptive Packet-Radio Network," Tactical Communications Conference, Fort Wayne, Indiana, Apr. 1990.

Bingham, Multicarrier Modulation for Data Transmission: An Idea Whose Time Has Come, 1990 IEEE.

Estabrook, et al., "A 20/30 GHZ Personal Access Satellite System Design," 1989 IEEE.

Filip, et al., "Optimum Utilization of the Channel Capacity of a Satellite Link in the Presence of Amplitude Scintillations and Rain Attenuation," 1990 IEEE.

Gilhousen, et al., "Increased Capacity Using CDMA for Mobile Satellite Communications," May 1990, IEEE Journal on Selected Areas in Communications, p. 503-14.

Goodman, et al., "Spread-Spectrum Mobile Radio with Variable-Bit-Rate Speech Transmission," 1982 IEEE.

Grover, et al., "Simulations and Experimental Studies on the Concept of a Rate-Adaptive Digital Subscriber Loop (RA-DSL)," 1991 IEEE.

Gupta, "Variable Coded MFSK Signaling in an Adaptive Wideband High-Throughput RF/MBC System," Milcom 91 Conference Record, 1991.

Hagenauer, et al., "On Hybrid Trellis-Coded 8/4 PSK Modulation Systems," 1989 IEEE.

Hagenauer, et al., "The Performance of Rate-Compatible Punctured Convolutional Codes for Digital Mobile Radio," 1990 IEEE.

Jacobsmeyer, "Adaptive Data Rate Communications for High Frequency Radio Channels," 1991 IEEE.

Jacobsmeyer,"Message Waiting Time Performance for Meteor-Burst Communication Systems," 1989 IEEE.

Kim, "Adaptive Rate Coding in Frequency-Hopped Random Access Communications Systems," IEEE Global Telecommunications Conference, Orlando, Florida, Dec. 6-9, 1992.

Mazur, et al., "Adaptive Forward Error Correction Techniques in TDMA," Sep. 19-23, 1983, Phoenix, Arizona.

Mui, "Variable Rate Signaling in Conjunction with Coding for Meteor Burst Communications," 1991 IEEE.

Murota, et al., GMSK Modulation for Digital Mobile Radio Telephony, IEEE Trans. On Comm., vol. COM-29, No. 7, Jul. 1981, pp. 1044-1050.

Pahlavan, et al.,"Spread-Spectrum Multiple-Access Performance of Orthogonal Codes for Indoor Radio Communications," May 1990, IEEE Transactions on Communications, pp. 574-577.

Petit, "Clover-II: A technical Overview," ARRL Amateur Radio, Sep. 27-29, 1991, pp. 124-129.

Schilling, et al., "Meteor Burst Communications for LPI Applications," 1990 IEEE.
Smith, "Multi-Waveform Technologies for Multi-Mission Radio Applications," 1991 MILCOM.
Smith, et al., "A Dual Frequency-Band, Dual Bit-Rate Payload Concept for Communications Satellites," Sixth International Conference on Digital Satellite Communications, Sep. 19-23, 1983, IEEE Catalog No. 83CH1848-1, pp. XI9-XI17.
Stuber, et al., "An Adaptive Rate Algorithm for FH/BFSK Signaling," 1988 IEEE.
Sundberg, et al., "Hybrid Trellis-Coded 8/4 PSK Systems," 1989 IEEE.
Wicker, "Hybrid-ARQ Reed-Solomon Coding in an Adaptive Rate System," 1989 IEEE.
Willis, "Fade Counter measures Experiment," 1990 IEEE, London.
Willis, "Fade counter-measures applied to transmissions at 20/30 GHz," Electronics & Communication Engineering Journal, Apr. 1991.
Yates, "An Adaptive Rate Digital Transmission Scheme for Satellite Links Affected by Rain," 1986 ICDSC-7.
Zhang, et al., "An Integrated Voice/Data System for Mobile Indoor Radio networks," 1990 IEEE.
CCITT v. 29, "9600 Bits Per Second Modem Standardized For Use On Point-To-Point 4-Wire Leased Telephone-Type circuits," Nov. 1, 1988.
CITT v.22bis, "2400 Bits Per Second Duplex Modem Using The Frequency Division Technique standardized For Use On The General Switched Telephone Network And On Point-To-Point 2-Wire Leased Telephone-Type Circuits", Nov. 1, 1988.
CCITT v22, "1200 Bits Per Second Duplex Modem Standardized For Use In The General Switched Telephone Network And On Point-To-Point 2-Wire Leased Telephone-Type circuits," Nov. 1, 1988.
Order re Claim Construction, Sep. 11, 2006.
Tentative Order re Claim Construction, Jul. 31, 2006.
Expert Report of Professor Donald Cox Concerning Claim Construction for U.S. Patent No. 5,425,051, Apr. 24, 2006.
Declaration of Bernard Sklar, Ph.D. In Support Of Qualcomm's Claim Construction For U.S. Patent No. 5,425,051, Apr. 22, 2006.
Salmasi, A., et al., "On the System Design Aspects of Code Division Multiple Access (CDMA) Applied to Digital Cellular and Personal Communications Networks," 41$^{st}$ IEEE Vehicular Technology Conference, St. Louis, MO, pp. 57-62, May 19-22, 1991.
Sklar, B., Digital Communications, Fundamentals and Applications, Prentice-Hall, Inc., pp. 52-53, 202-203, 595-596, 1988.
Kaltenmeier, et al. "A Subband Coder for Digital Speech Transmission in the Digital Cellular Radio System CD 900," Nordic Seminar on Digital Land Mobil Radiocommunication, pp. 279-285, Feb. 5-7, 1985.
Lender, "The Duobinary Technique for High-Speed Data Transmission," IEEE Transactions on Communication and Electronics, vol. 82, pp. 214-218, May 1963.
Salz, "An Experimental Digital Multilevel FM Modem," IEEE Transactions on Communication Technology, vol. COM-14, No. 2, pp. 259-265, Jun. 1966.
Plaintiff Broadcom Corporation's Disclosure Of Asserted Claims And Final Infringement Contentions, *Broadcom Corp. v. Qualcomm Inc.*, Case No. 8:05-cv-467, United States District Court for the Central District of California, Exhibit B (pp. 5, 8 and 11), Alleged Admissions 1 and 2 (QPSK and 16QAM are distinct modulation "types"), and 3 (GMSK and 8PSK are distinct modulation "types"), Nov. 1, 2006.

Plaintiff Broadcom Corporation's Second Amended Disclosure Of Asserted Claims And Preliminary Infringement Contentions, *Broadcom Corp. v. Qualcomm Inc.*, Case No. 8:05-cv-467, United States District Court for the Central District of California, Exhibit C (pp. 8, 11 and 13), Alleged Admissions 4 and 5 (QPSK and 16QAM are distinct modulation "types"), and 6 (GMSK and 8PSK are distinct modulation "types"), Sep. 22, 2006.
Qualcomm's Preliminary Invalidity Contentions with Exhibits A-1 through A-35 and B-1 through B-22, *Broadcom Corp. v. Qualcomm, Inc.*, U.S. District Court for the Central District of California, Southern Division, SACV05-0467-JVS (RNBx), Jan. 30, 2009.
Benice, R.J. et al., "Adaptive Modulation and Error Control Techniques," IBM Corporation, 1966 (made available in 1977).
Magazanik, USSR Author's Certificate No. 462292, published Feb. 28, 1975.
Salikov, USSR Description of Invention for Inventor's Certificate No. 1585902 A1, published Aug. 15, 1990.
Acampora, A., "The Use of Resource Sharing and Coding to Increase Capacity of Digital Satellites," IEEE Journal of Selected Areas in Communications, vol. SAC01, No. 1, Jan. 1983.
Khan, M.H. et al., Adaptive Forward Error Control for Digital Satellite Systems, IEEE Trans. On Aerospace and Electronic Systems vol. AES-21, No. 4, pp. 547-558, Jul. 1985.
Cimini, Jr., L. et al., Analysis and Simulation of a Digital Mobile Channel Using Orthogonal Frequency Division Multiplexing, IEEE Transactions on Communications, v. 33, n. 7, pp. 665-675, Jul. 1985.
Acampora, A., A Wireless Network for Wide-Band Indoor Communications, IEEE Journal on Selected Areas in Communications, vol. SAC-1, No. 5, pp. 796-805, 1987.
Baier, A., Bit Synchronization and Timing Sensitivity in Adaptive Viterbi Equalizers for Narrowband-TDMA Digital Mobile Radio Systems, IEEE Vehicular Technology Conference, vol. 38, pp. 377-384, Jun. 1988.
Goode, S.H., "A Comparison of Gaussian Minimum Shift Keying to Frequency Shift Keying for Land Mobile Radio," IEEE Vehicular Technology Conference, vol. 34, pp. 136-141, May 1984.
GSM 05.04, Jul. 15, 1988.
"Cellular System Mobile Station-Land Station Compatibility Specification," IS-3-D, Electronic Industries Association, Mar. 1987.
Hirade, K. et al., "Digital Transmission Technology for Mobile Radio Communication," Institute of Electronics, Information and Communication Engineers, Feb. 1982.
Korn, I., "GMSK with Limiter Discriminator Integrator Detection in Satellite Mobile Channel," IEEE Proceedings, vol. 136, pt. 1, No. 5, pp. 361-366, Oct. 1989.
Maloberti, A., "Radio Transmission Interface of the Digital Pan European Mobile System," IEEE 39$^{th}$ Vehicular Technology Conference, vol. 2, pp. 712-717, May 1989.
Meyers, R.A., et al., "Synthesiser Review for Pan-European Cellular Radio," Proc. IEEE Colloquium on VLSI Implementations for 2$^{nd}$ Generation Digital Cordless Mobile Telecommunications Systems, Aug. 1-Aug. 8, 1990.
Thomas, C.M. et al., "A New Generation of Digital Microwave Radios for U.S. Military Telephone Networks," IEEE Transactions on Communications, vol. COM-27, No. 12, pp. 1916-1928, Dec. 1979.
Exhibits A-E of Plaintiff Broadcom Corporation's Preliminary Infringement Contentions for the '051 Patent and Related Cross-Claim, *Broadcom Corporation v. Qualcomm Incorporated*, Case No. SACV05-0467-JVS (RNBx), U.S. District Court for the Central District of California—Southern Division, Jan. 9, 2009.

* cited by examiner

RADIO FREQUENCY COMMUNICATION NETWORK HAVING ADAPTIVE COMMUNICATION PARAMETERS

CROSS-REFERENCE TO RELATED APPLICATIONS

This application is a continuation of U.S. patent application Ser. No. 10/996,643, filed Nov. 22, 2004 (still pending), which is a continuation of U.S. patent application Ser. No. 10/360,591, filed Feb. 6, 2003 (still pending), which is a continuation of Ser. No. 09/799,340, filed on Mar. 5, 2001 (now abandoned), which is a continuation of U.S. patent application Ser. No. 09/123,876, filed on Jul. 28, 1998 (now abandoned), which is a continuation of U.S. patent application Ser. No. 08/476,550, filed on Jun. 6, 1995, now U.S. Pat. No. 5,862,171 issued Jan. 19, 1999, which is a continuation of U.S. patent application Ser. No. 08/270,107, filed on Jun. 30, 1994, now U.S. Pat. No. 5,425,051 issued Jun. 13, 1995, which is a continuation of U.S. patent application Ser. No. 07/973,237, filed on Nov. 9, 1992 (now abandoned), all of which are hereby incorporated by reference in their entireties.

AUTHORISATION PURSUANT TO 37 C.F.R. 1.71(d) AND (e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserve all copyright rights whatsoever.

INCORPORATION BY REFERENCE

The following patent applications are incorporated in their entirety by reference:
1. abandoned application of Charles D. Gollnick, et al., U.S. Ser. No. 07/857,603 filed Mar. 30, 1992;
2. pending U.S. patent application of Meier, et al., Ser. No. 07/968,990, filed Oct. 30, 1992;
3. abandoned application of Ronald L. Mahany, U.S. Ser. No. 07/485,313 filed Feb. 26, 1990;
4. pending application of Steven E. Koenck, et al., U.S. Ser. No. 07/305,302 filed Jan. 31, 1989;
5. application of Ronald L. Mahany, et al., U.S. Ser. No. 07/389,727 filed Aug. 4, 1989, now issued as U.S. Pat. No. 5,070,536 on Dec. 3, 1991;
6. application of Marvin L. Sojka, U.S. Ser. No. 07/292,810 filed Jan. 3, 1989, now issued as U.S. Pat. No. 4,924,462 on May 8, 1990; and
7. European Published Patent Application EPO 353759 published Feb. 7, 1990.

BACKGROUND OF THE INVENTION

The present invention in a preferred implementation relates to improvements in radio data communication networks wherein a number of mobile transceiver units are to transmit data to a number of base stations under a wide range of operating conditions. To compensate for the wide range of operating conditions, adaptability has been provided using an exchange of parameters that define the nature of the network communication. The invention is preferably to be applicable as an upgrade of an existing data capture system wherein a number of hand-held transceiver units of an earlier design are already in the field representing a substantial economic investment in comparison to the cost of base stations, accessories and components. In installations spread over an extensive area, a large number of mobile portable transceiver units may be employed to gather data in various places and multiple base stations may be required. In a variety of such installations such as warehouse facilities, distribution centers, and retail establishments, it may be advantageous to utilize not only multiple bases capable of communication with a single host, but with multiple hosts as well.

An early RF data collection system is shown in Marvin L. Sojka, U.S. Pat. No. 4,924,462 assigned to the assignee of the present application. This patent illustrates (in the sixth figure) a NORAND® RC2250 Network Controller which supports one base transceiver for communication with multiple mobile portable transceivers. The exemplary prior art device is capable of communicating with a host computer through an RS232C interface at up to 19,200 baud in asynchronous mode. In order for an optional RS422 interface to be substituted for an RS232C interface, the unit must be opened and substitute circuitry components installed within it.

SUMMARY OF THE INVENTION

The present invention provides an improved data communication system which maintains RF communication links between one or more host computers and one or more base transceiver units, each of which may be communicative with many mobile portable transceiver units being moved about a warehouse complex for the collection of data. Specifically, the invention provides a data communication system for collecting and communicating data in the form of RF signals which has a plurality of RF transceivers that store and modify at least one variable operating parameter. From the stored parameter(s), each of transceivers control the operation of transmission and reception. The transceivers also evaluate the effect of the stored parameter based by analyzing each transmission received, and determine whether to make changes in the stored parameter. If changes are needed, the transceivers, modify and store the modified operating parameter and begin operation based thereon.

The operating parameters involve: 1) the size of data segments to be transmitted; 2) the length or frequency of the spreading code used for direct-sequence spread spectrum communication; 3) the hopping rate, coding, and interleaving for frequency-hopping spread spectrum communication; and 4) the type of RF source encoding used.

In addition, the RF transceivers used in the data communication network of the present invention use system-default values to reset the operating parameters if a series of failed communication exchanges occurs, so that communication can be re-established.

It is therefore an object of the invention to provide an adaptive radio communication system which permits the interconnection of one or two host computer devices to a multiplicity of base transceiver units which may include both prior art existing installed units and new generation units capable of spread spectrum radio transmission.

It is a further object of the invention to provide an adaptive RF data communication system which optimizes communication based on a set of operating parameters.

It is a further object of the invention to provide an adaptive RF data communication system which maintains communication based on a set of operating parameters for optimizing communication, wherein the operating parameters involve: 1) the size of data segments to be transmitted; 2) the length or frequency of the spreading code used for direct-sequence spread spectrum communication; 3) the hopping rate, coding, and interleaving for frequency-hopping spread spectrum communication; and 4) the type of RF source encoding to be used.

It is a further object of the invention to provide a radio communication system network controller which via a communication exchange optimizes a set of operating parameters, yet returns the parameters to their previous or system-default values upon failed communication.

These and other objects of the invention will be apparent from examination of the detailed description which follows.

DESCRIPTION OF THE DRAWING FIGURES

DETAILED DESCRIPTION OF THE INVENTION

Figure 1:
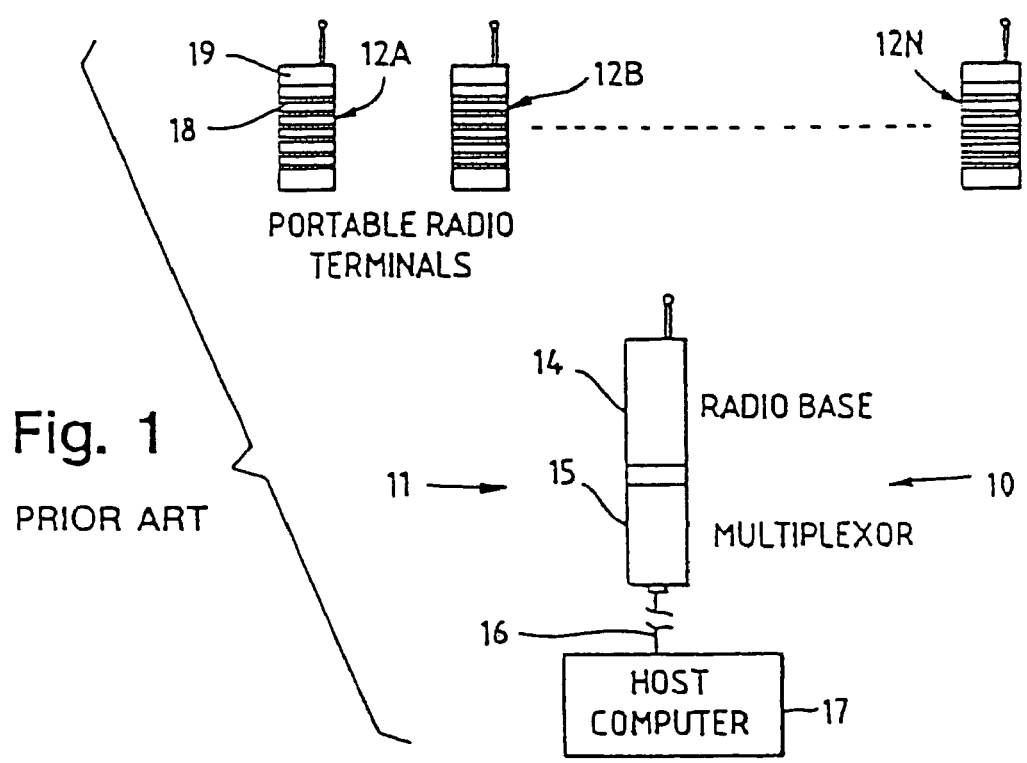
FIG. 1 is a block diagram of the prior art data communication system.

FIG. 1 shows an existing radio frequency data transmission system 10 wherein a base station transceiver means 11 has a number of mobile transceiver units such as 12A, 12B, . . . , 12N in radio communication therewith.

By way of example, the base station may be comprised of a radio base unit 14 such as the model RB3021 of Norand Corporation, Cedar Rapids, Iowa, which forms part of a product family known as the RT3210 system. In this case, the radio base 14 may receive data from the respective mobile RF terminals, e.g. of type RT3210, and transmit the received data via a network controller and a communications link 16 (e.g. utilizing an RS-232 format) to a host computer 17.

The data capture terminals 12A, 12B, . . . , 12N may each be provided with a keyboard such as 18, a display as at 19, and a bar code scanning capability, e.g., via an instant bar code reader such as shown in U.S. Pat. No. 4,766,300 issued Aug. 23, 1988, and known commercially as the 20/20 High Performance Bar Code Reader of Norand Corporation.

Figure 2:
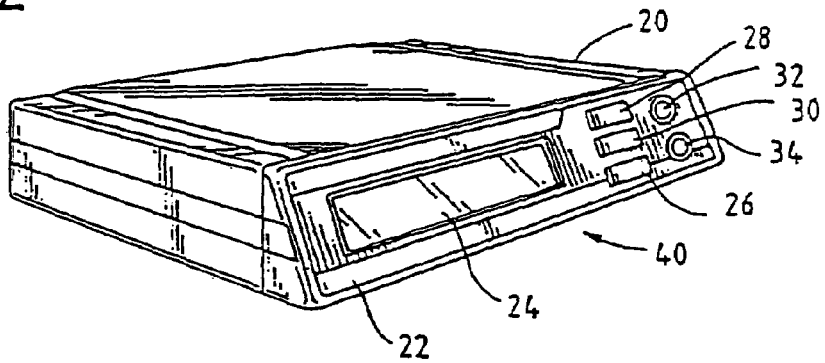
FIG. 2 is a perspective view of the invention.

FIG. 2 provides a perspective view of the invention 40 in the preferred embodiment case 20. Front panel 22 is provided with display 24 and select key 26, up key 28 and down key 30. Power indicator 32 comprises a low power green light emitting diode which is energized when power is supplied to the invention 10. Error condition indicator 34 is a yellow LED which is software controlled to be energized if the invention 10 is in error condition.

Figure 3:
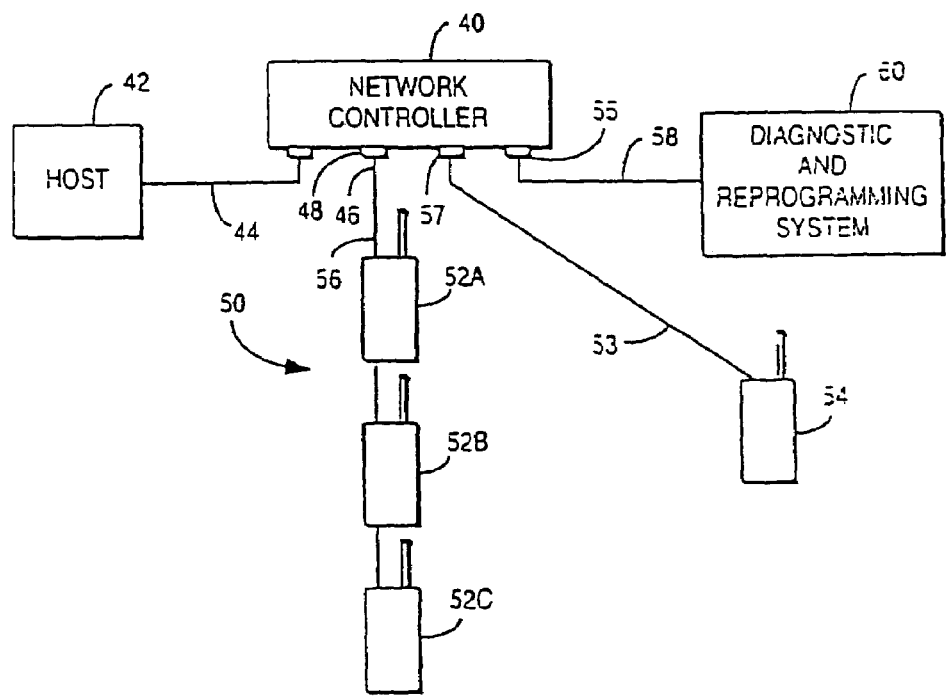
FIG. 3 is a schematic representation of an exemplary radio communication system utilizing the invention.

FIG. 3 discloses a diagrammatic illustration of a radio communication system in accordance with the present invention. Invention network controller 40 is coupled to host computer 42 such that data may be interchanged between the devices over host communications link 44, which may be either in an RS232C format or selectively in an RS422 format. The host communication link 44 couples to controller 40 at host port 46.

First communication port 48 of controller 40 provides means for coupling of network 50 to controller 40. Network 50 comprises a number of base RF transceiver units 52A, 52B and 53B, each of which may, be selectively employed in the radio frequency communication of data from mobile transceiver units. It is to be understood that base transceiver units 52 are designed and equipped to be operable in the exchange of data with network controller 40 over network link 56 such that each base transceiver unit 52A, 52B, or 53C may independently exchange data with network controller 40 through first communication port. When first communication port 48 is intended for operation with a network such as network 50 of base transceiver units 52A, 52B and 53C, for example, network controller 40 is selectively operated to provide an RS485 interface at first communication port 48. First communication port 48 may be alternately selected to operate as an RS232C interface, as an RS422 interface, as a proprietary NORAND® Radio One Node Network interface or as a high speed V.35 interface. The selection of interface to be provided at first communication port 48 is front panel controlled, that is, the user may operate front panel keys 28, 30 and 26 (See FIG. 2) to direct the proper interface to be provided at first communication port 48.

Base transceiver units 52A, 52B, and 52C are coupled to network link 56 by serial means, rather than parallel means, and each may be caused to transmit or to receive independently from the others while additionally being communicative with network controller 40 in a randomly chosen fashion.

It is further to be understood that interface translation is provided within controller 40 such that data communicated at first communication port 48 may be directed to host 42 at port 46 via properly chosen interface means as is required by the host 42 with which communication is intended.

Like first communication port 48, second communication port 57 may be internally switched among interface choices of these types: RS232C, RS422, V.35, RS485 and proprietary NORAND® Radio One Node Network interface. In the illustrated arrangement of FIG. 3, for example, second communication port 57 is coupled over third link 53 to previously installed base transceiver 54, which heretofore had been used in a prior art system as is illustrated in FIG. 1. Because of limitations of base transceiver 54, it must communicate via RS232C interface format and therefore, second communication port 57 must be selected to operate in RS232C interface mode. However, when second communication port 57 is desired to communicate with a network via RS485 interface, front panel keys 26, 28 and 30 may be manipulated by the user to provide the RS485 interface availability at second communication port 57. Likewise, second communication port 57 may be selected to operate as an RS422 interface, as a V.25 interface, or as the proprietary NORAND® Radio One. Node Network interface.

Diagnostic port 55 provides a fourth communication pathway for network controller 40, providing an asynchronous port operable at 300 to 19,200 baud as an RS232C interface. When desirable, diagnostic port 55 may be coupled by diagnostic link 58 to diagnostic device 60 for purposes of error diagnosis of controller 40 by diagnostic device 60, or for reprogramming of memory devices within controller 40 when desired. It is contemplated that diagnostic device 60 comprises a 16 or 32 bit microprocessor commonly known as a personal computer or "PC". The mode of coupling between diagnostic device 60 and network controller 40 may be direct or through remote means by use of a modem.

Figure 4:
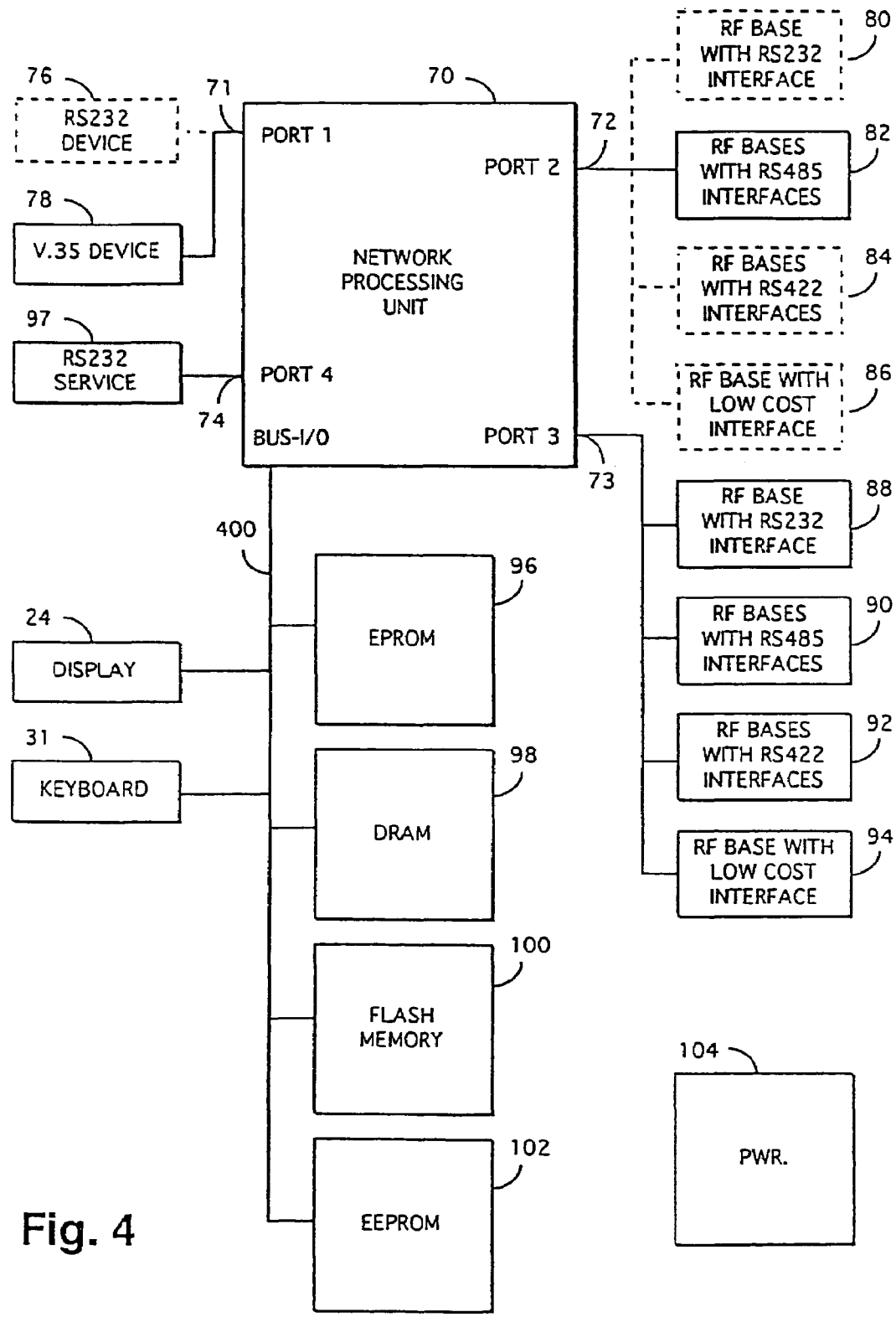
FIG. 4 is a diagrammatic illustration of the control circuitry elements of the invention.

Referring now to FIG. 4, a central processing unit 70 is provided with at least four data communication ports, illustrated at numerals 71, 72, 73, and 74. First data communication port 71 may be selectively coupled to RS232 interface member 76 or V.35 interface member 78. The choice of whether RS232 interface member 76 or V.35 interface member 78 is chosen is dependent upon the operating characteristics presented by the host computer, such as host computer 42 of FIG. 3, with which network controller 40 will communicate. The choice of whether first communication port 71 is coupled to interface member 76 or to interface member 78 depends on the front panel selection made by the user by keys 26, 28, and 30 shown in FIG. 2.

Second communication port 72 may be selectively coupled to RS232 member 80 or to RS485 interface member 82 or to RS422 interface member 84 or to NORAND® Radio One Node Network proprietary interface member 86. By use of front panel keys 26, 28, and 30 of FIG. 2, the user may select second communication port 72 to be coupled to any one of interface members 80, 82, 84, and 86.

Third communication port 73 is identical to second communication port 72 in functionality, being selectively couplable to RS232 interface member 88, to RS485 interface member 90, to RS422 interface member 92 or to NORAND® Radio One Node Network proprietary interface member 94.

In the preferred embodiment of the invention 40, central processing unit 70 of FIG. 4 comprises a Motorola™ 68302 integrated chip cooperative with an application specific integrated circuit. Central processing unit 70 employs novel features allowing the bidirectional use of a data communicative line of the Motorola™ 68302 chip and a single clock signal line to eliminate the need for coder-decoder members to be associated with the Motorola™ 68302 chip while allowing the use of only one pair of signal wires to be coupled to the RS485 interfaces' 82 and 90 of FIG. 4.

Fourth communication port 74 of central processing unit is coupled to asynchronous RS232 interface member 97 to be available for interconnection of a diagnostic device therewith.

Also coupled to central processing unit 70 are display member 24 and keyboard member 31 with which keys 26, 28, and 30 of front panel 22 (FIG. 2) are interactive.

Memory elements including EPROM element 96, DRAM unit 98, FLASH memory unit 100 and EEPROM element 102 are intercoupled with each other and with central processing unit 70.

Power supply member 104 is selectively attachable to invention network controller 40. In order to avoid the necessity of different models of network controller 40 depending on the local electrical power utility's operating characteristics, power supply 104 is provided in optional models depending on the country in which it is to be used, power supply 104 being capable of providing satisfactory output power to network controller 40 regardless of the voltage or frequency of the input source provided to power supply 104.

Figure 6:
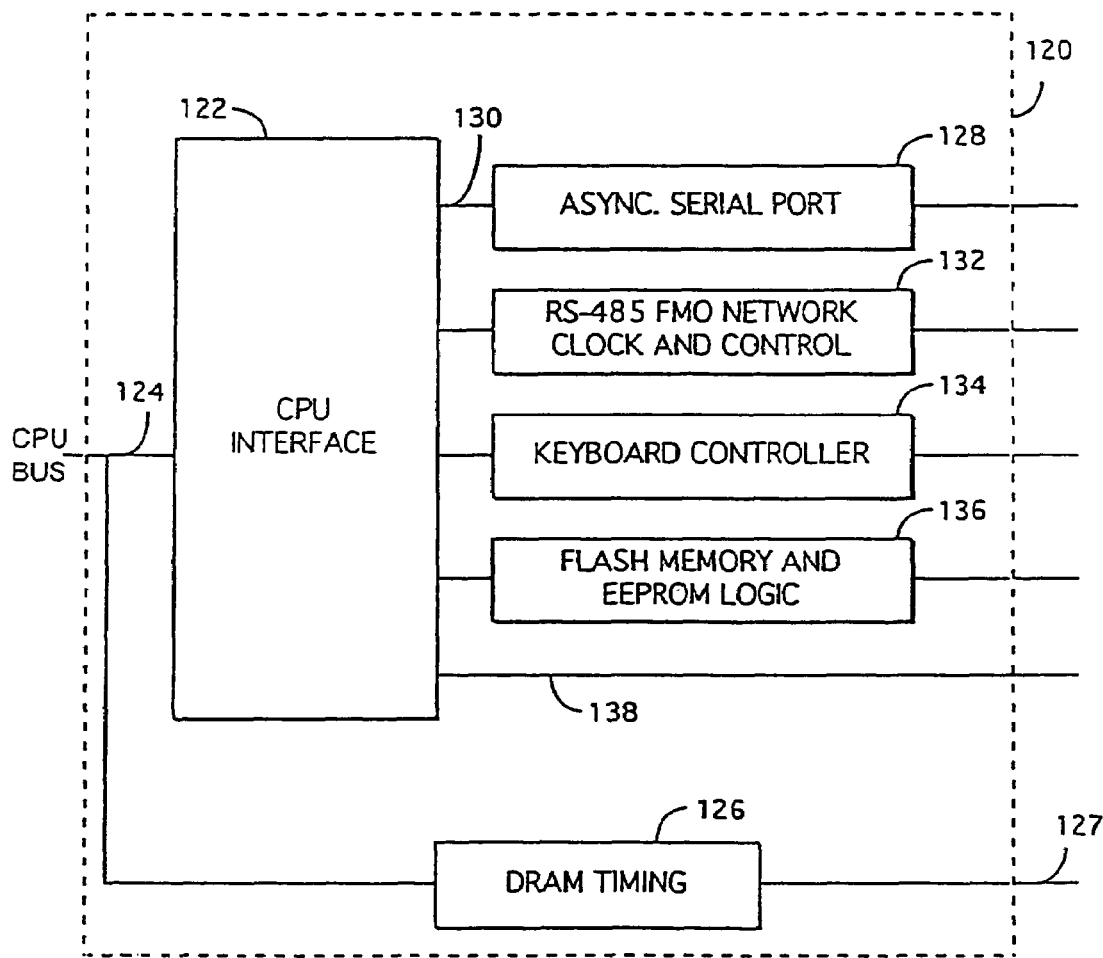
FIG. 6 is a diagrammatic illustration of the application specific integrated circuit of the invention.

The application specific integrated circuit (ASIC) used in the invention network controller 40 is disclosed in FIG. 6 and is identified by the numeral 120. ASIC 120 comprises a central processor unit interface 122 member which is coupled to the central processor unit bus by CPU bus link 124 which extends from ASIC 120. Also coupled to the CPU bus link 124 is dynamic random access memory (DRAM) timing element 126, which provides network controller 40 with timing signals for the DRAM member 98 illustrated in FIG. 4 when memory refresh of the DRAM 98 is indicated. DRAM timing element 126 is also coupled exteriorly to the ASIC 120 to DRAM member 98 by DRAM link 127.

Central processing unit interface 122 is coupled to asynchronous signal processing element 128 by signal path 130. Asynchronous signal processing element 128 comprises a baud rate generator cooperative with a universal asynchronous receiver-transmitter.

Also coupled to central processing unit interface 122 is network clock and control member 132 which comprises a programmable network clock generator which can be selectively programmed to generate an optional clock speed for a network to be coupled through RS485 interfaces 82 and 90 seen in FIG. 4. Network clock and control member 132 also provides detection means for detections of failure conditions on a linked network and provides control signals to system components in response thereto, including interrupt signals to programmable interrupt coordinator circuitry included in central processing interface 122. Network clock and controller member 132 provides data encoding by the FMO standard, then the encoded data may be operated upon by RS485 interfaces 82 and 84 and transmitted and received by single twisted pair means to multiple serially networked base transceiver units exemplified by base transceiver unit 52A, 52B, and 52C illustrated in FIG. 3.

Keyboard controller element 134 is coupled to central processing unit interface and provides a link exterior to ASIC 120 to keyboard 31 (See FIG. 3).

FLASH memory/EEPROM logic control member 136 is coupled to central processing unit interface 122 and comprises control functions for FLASH memory element 100 and EEPROM memory element 102 of FIG. 3.

Central processing unit interface 122 is also coupled by line 138 to latches exterior to ASIC 120.

It is to be understood that the base transceiver units 52A, 52B, and 52C illustrated in FIG. 3 are communicative with mobile transceiver units by electromagnetic radio means. The mobile transceiver units may be associated with bar code scanning devices such as the NORAND® 20/20 High Performance Bar Code Reader whereby the scanning devices scan an object having a bar code associated therewith and collect information stored in the bar code, which information is then transmitted through the mobile transceiver units to base transceiver units such as base transceiver units 52A, 52B, and 52C or base transceiver unit 54 of FIG. 3. The bar code data received by said base transceiver units is then transmitted in the example of FIG. 3, over network 50 by base transceiver units 52A, 52B, or 52C, or over link 53 by base transceiver unit 54, to network controller 40 which performs the routing and delivery of the data to the stationary data processor, or processors, such as shown for example, by host 42 of FIG. 3.

Description of FIGS. 7 through 11

Figure 7:
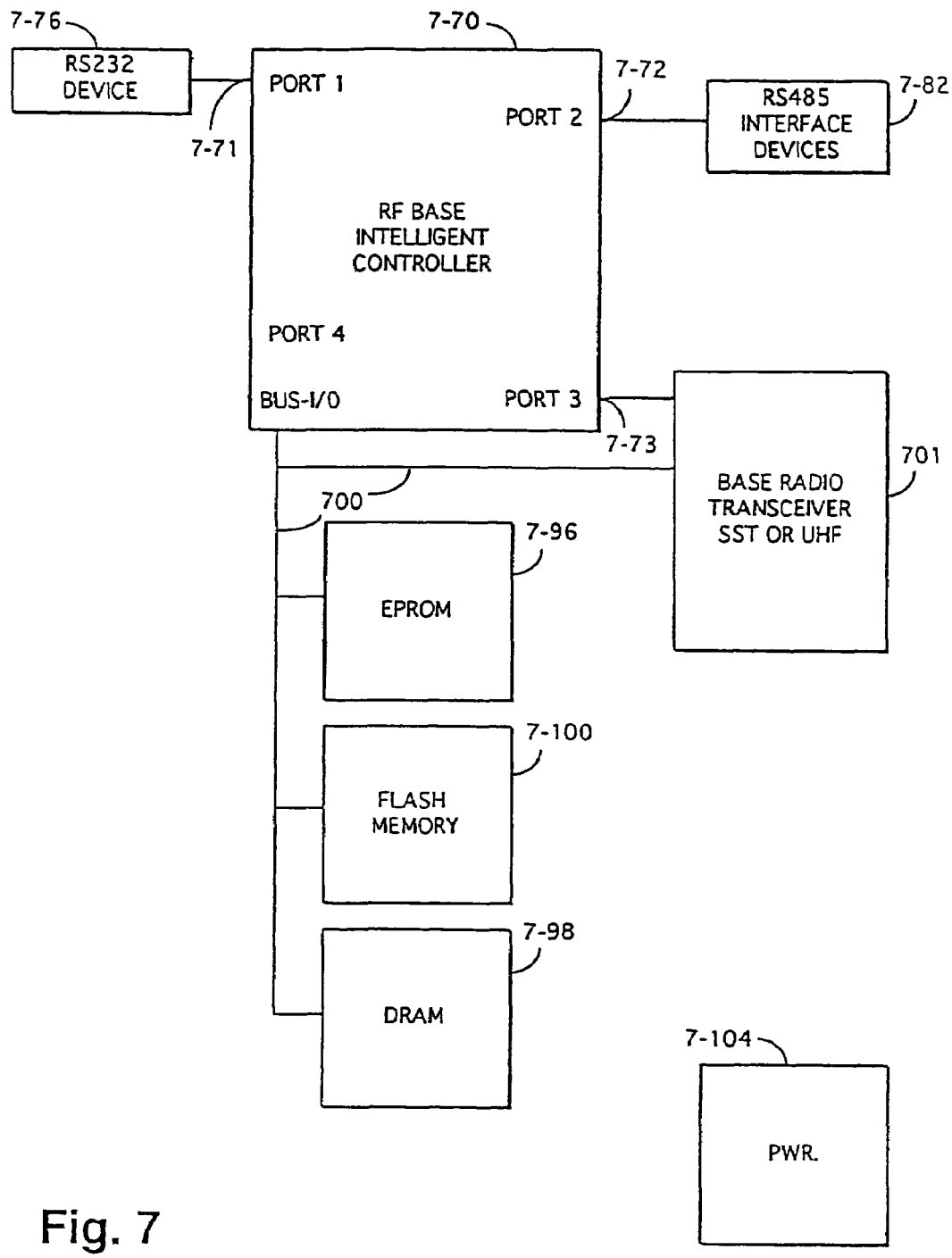
FIG. 7 is a block diagram showing an exemplary implementation of intelligent network and router transceiver units such as the network transceiver units of FIG. 3.

FIG. 7 shows a block diagram of a particularly preferred intelligent base transceiver unit known as the RB4000. It will be observed that the components correspond with components of the network controller of FIG. 4, and similar reference numerals (preceded by 7-) have been applied in FIG. 7. Thus, the significance of components 7-70 through 7-73, 7-76, 7-82, 7-96, 7-98, 7-100 and 7-104 will be apparent from the preceding description with respect to FIGS. 4 and 6, for example. I/O bus 700 may be coupled with a spread spectrum transmission (SST) or ultra high frequency (UHF) transceiver 701 which may correspond with any of the transceivers of units 52A, 52B, 52C or 54 previously referred to. The network controller 70 could have a similar RF transceiver coupled with its data port 72 or 73 and controlled via input/output bus 400, e.g. for direct RF coupling with router transceivers such as 901, 901, FIG. 9.

Figure 8:
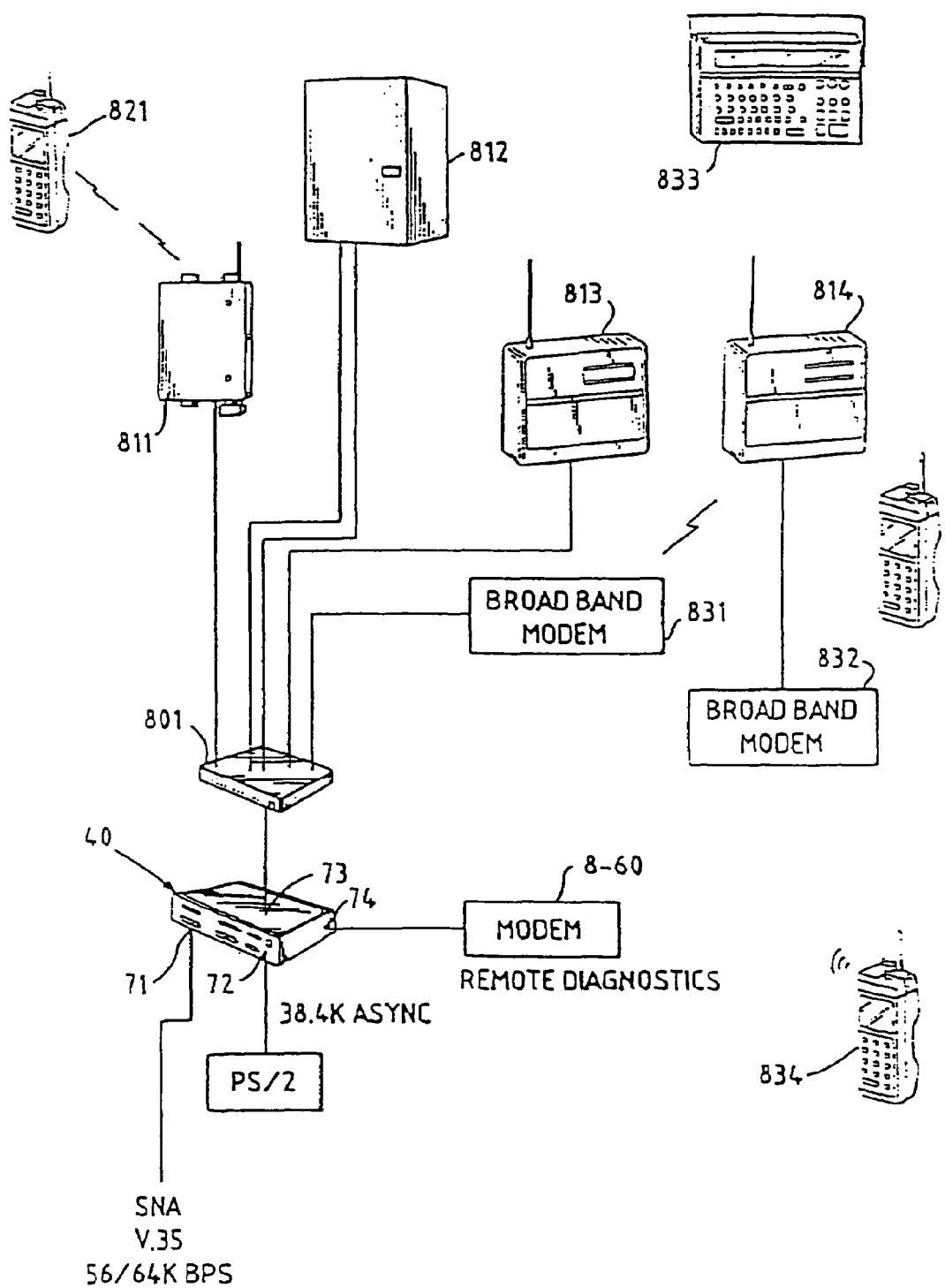
FIG. 8 is a diagram of an RF system utilizing a network controller according to FIGS. 2-6, with one of its network ports configured for communication with a second host, and another of its ports coupled with a multiplicity of RF transceivers via an adapter unit.

Referring to FIG. 8, a network controller 40 is shown with port 71 configured for interface with a host port type SNA V. 35 56K/64K bits per second. Port 72 is shown as configured for communication with a personal computer of the PS/2 type operating asynchronously at 38.4K bits per second. Port 74 is coupled with a modem 8-60 providing for remote diagnostics and reprogramming of the network controller 40.

Port 73 of network controller 40 is shown as being connected with an adapter component 801 known as the MBA3000. A specification for the MBA3000 if found in Appendix A following this detailed description. In the operating mode indicated in FIG. 8, the adapter 801 serves to couple controller 40 sequentially with four radio base transceiver units such as indicated at 811 through 814. Component 811 is a commercially available radio base known as the RB3021 which utilizes features of Sojka U.S. Pat. No. 4,924,462 and of Mahany U.S. Pat. No. 4,910,794 both assigned to the present assignee, and the disclosures of which are hereby incorporated herein by reference in their entirety. Base station 811 may communicate with a multiplicity of hand-held RF data terminals such as indicated at 821. Details concerning base transceiver units 812 and 813, 814 are found in the attached Appendices B and C, respectively. Base 814 is indicated as being coupled with the adaptor 801 via RF broadband modems 831 and 832. Base units 813 and 814 may communicate with a variety of mobile transceiver units such as those indicated at 833 and 834 which are particularly described in Appendices D and E.

Figure 9:
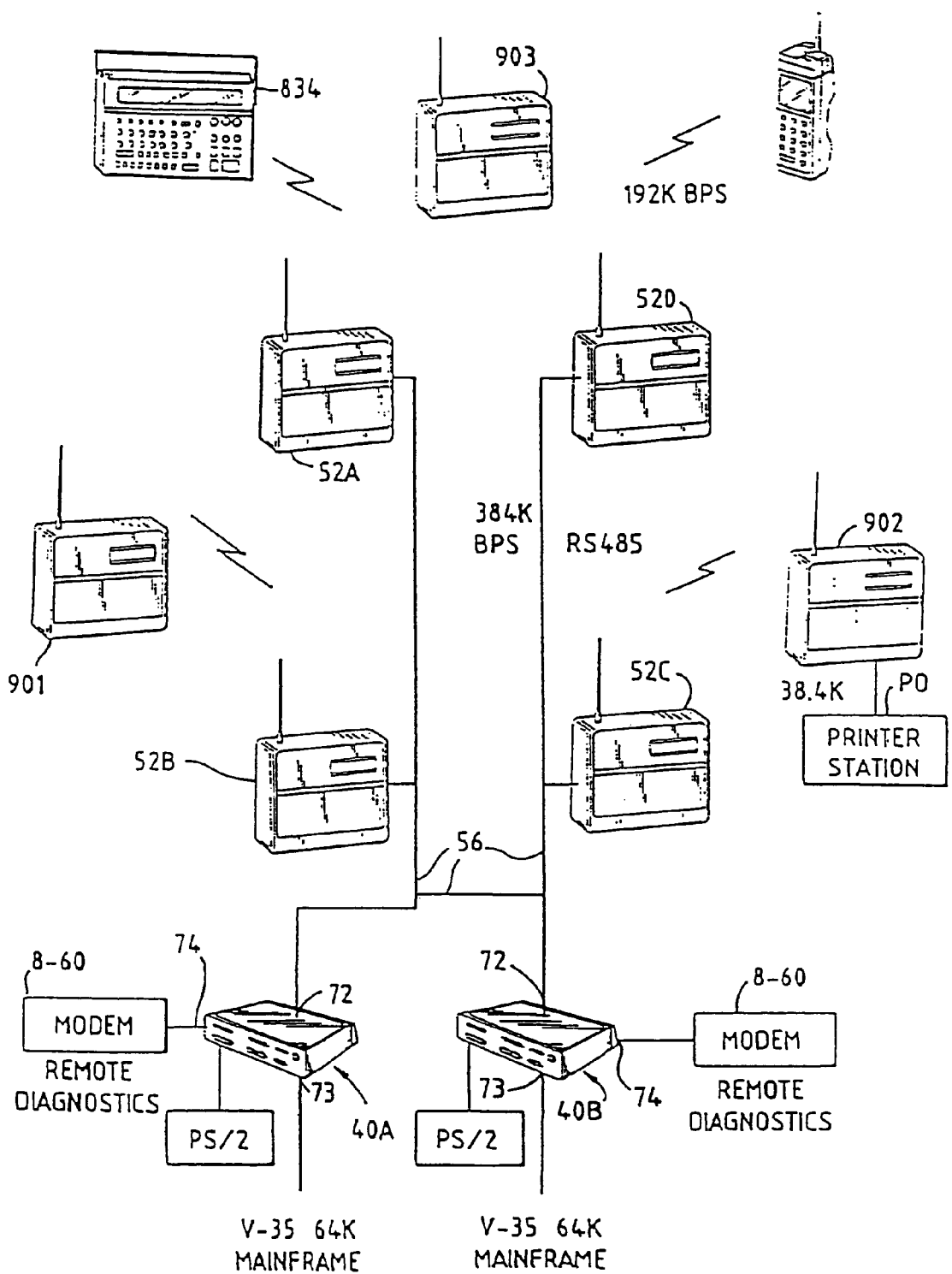
FIG. 9 is a diagram illustrating the use of two network controllers according to FIGS. 2-6, configured for dual host computers each, and having their relatively high data rate extended distance network ports coupled with a multiplicity of intelligent network and router transceiver units implemented according to FIG. 7.

FIG. 9 shows two network controllers 40A and 40B each with its host ports configured as with the controller 40 of FIG. 8. In this example, the second ports 72 of the controllers 40A and 40B are configured for communication a relatively high data rate relatively along a distance network channel 56 which may have the characteristics of the serial channel 56 of FIG. 3, for example, an RS485 channel operating at 384 kilobits per second (384K bps). Network base transceivers 52A, 52B and 52C may correspond with the correspondingly numbered transceiver units of FIG. 3, for example, and the network may have additional network transceivers such as 52D. Furthermore, the network transceivers may have RF coupling with router transceiver units such as indicated at 901, 902 and 903. Router transceiver unit 902 is illustrated as a RB4000 intelligent transceiver such as represented in FIG. 7 and having its input/output bus 700 coupled with a peripheral.

Figure 10:
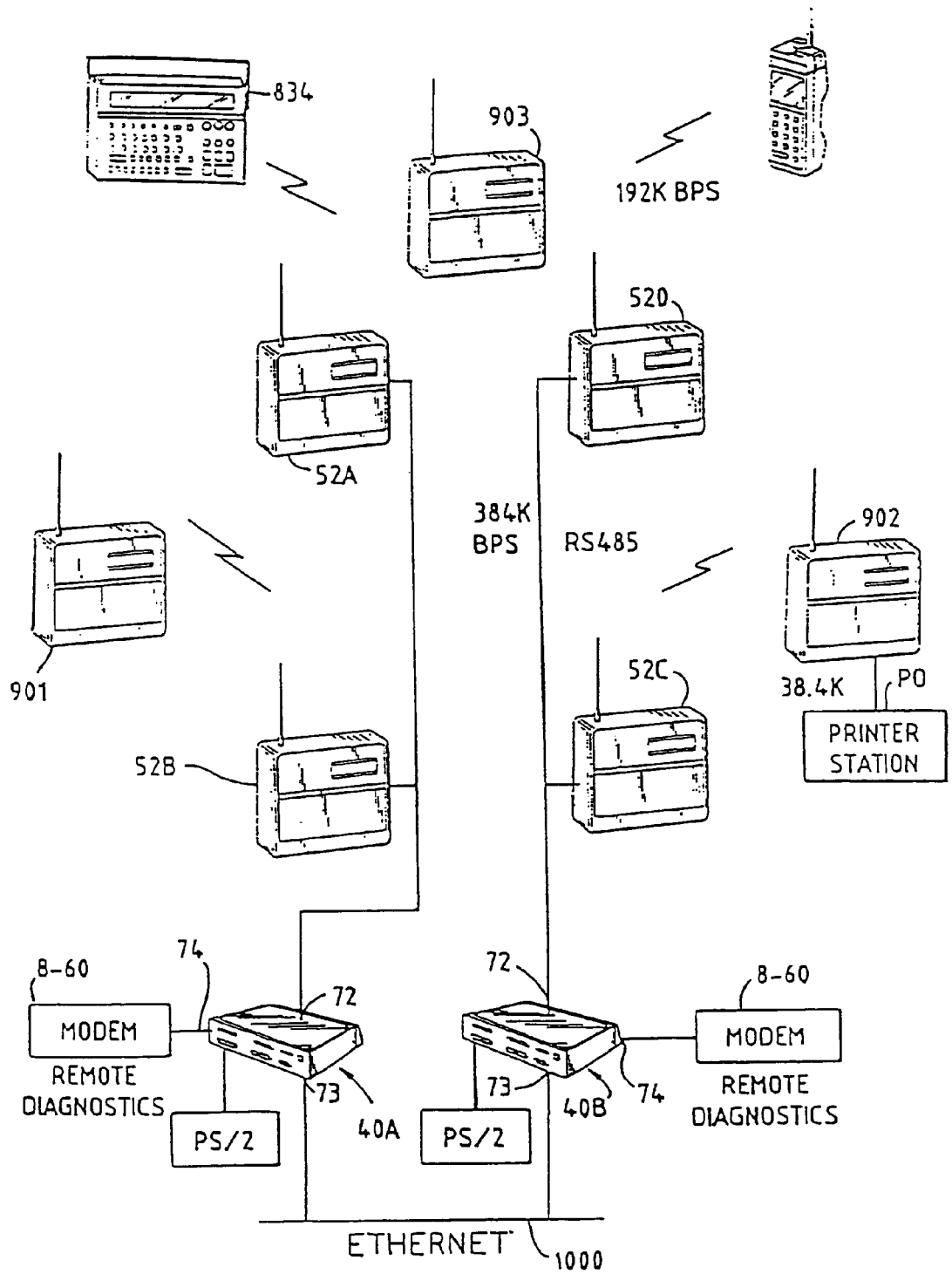
FIG. 10 is a diagram similar to FIG. 9 but showing the pari of coupled network controllers interfaced to a common relatively high data rate system having multiple hosts (e.g.) a local area network of the Ethernet type or equivalent e.g. fiber optic type.

FIG. 10 is entirely similar to FIG. 9, for example, except that ports 72 of the controllers 40A and 40B are coupled with separate serial type high data rate network channels, and ports 73 of the respective network controllers are coupled to a very high speed network e.g. in the several megabits per second range such as an Ethernet local area network 1000. Suitable interfaces are indicated at 1001 and 1002.

Figure 11:
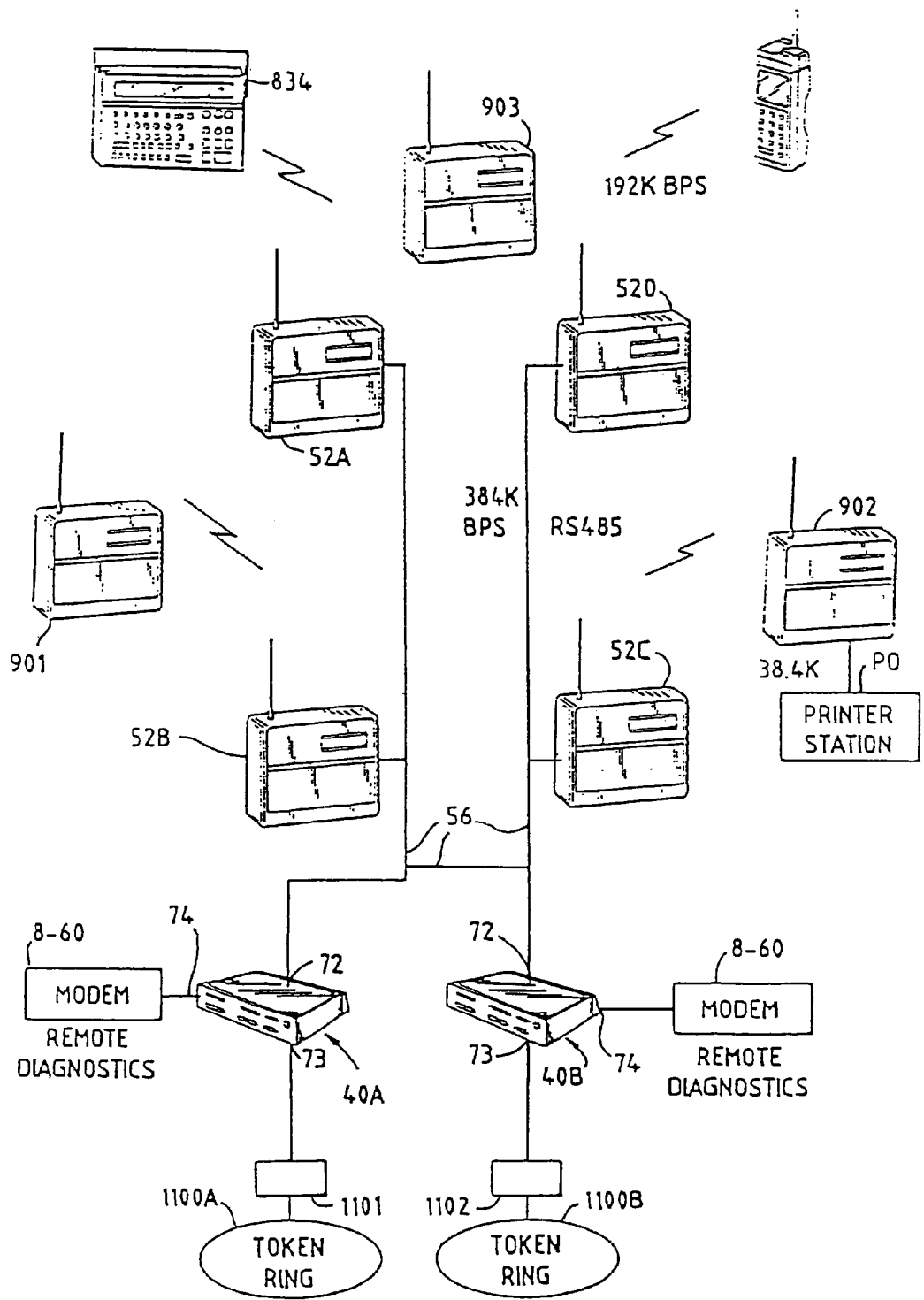
FIG. 11 is a diagram similar to FIG. 10 but indicating the network controllers being coupled to respective different high data rate multiple host systems (e.g., token ring type local area networks or other individual networks e.g., fiber optic loop networks of the collision-sense multiple-access type).

FIG. 11 is entirely similar to FIG. 9 except that the ports 73 of the network controllers 40A and 40B are coupled with respective local area ring type networks which may be separate from each other and each have two or more hosts such as represented in FIG. 9 associated with the respective ring networks such as token rings 1100A and 1100B. Suitable interface means are indicated at 1101 and 1102.

Figure 12:
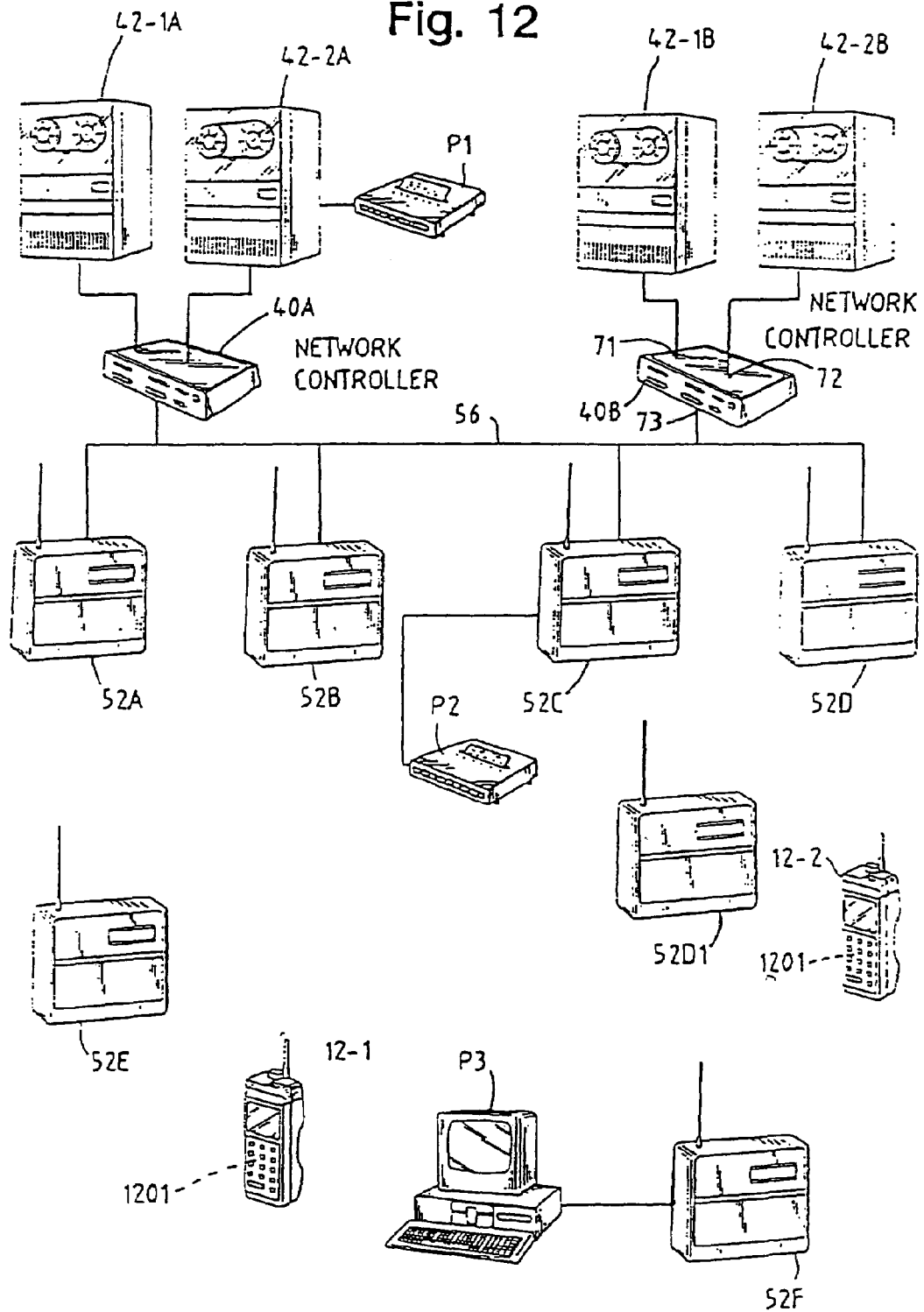
FIG. 12 is a view similar to FIG. 9 but intended to diagrammatically indicate a distribution of network and router transceivers and other elements of an on-line RF data collection system over an extensive area of a facility e.g. of one of the types previously mentioned.

Description of FIG. 12

FIG. 12 shows, for example, two network controllers 40A and 40B, each with two host computer units such as 42-1A. Host 42-2A is shown with a printer or other peripheral P1 which may generate bar codes, for example, for replacement of damaged bar codes or the like. Another printer P2 is shown associated with base 52C, again for example, for producing bar code labels where those are needed in the vicinity of a base station. In a large warehouse, relatively large distances may be involved for a worker to return to a printer such as P1 to obtain a new bar code label. Thus, it may be very advantageous to provide a printer P2 at the base station 52C which may be relatively close to a processing location which requires printed labels, e.g. a processing location in the vicinity of hand-held terminal 12-2 in FIG. 12. A base 52F may have a peripheral P3 associated therewith such as a large screen display, a printer or the like which may supplement the capabilities of a hand-held terminal, for example printing out new bar code labels at a convenient location, or providing a full screen display, rather than the more limited screen display area of the hand-held terminal 12-2.

If, for example, a base radio 52D which might be located at the ceiling level of a warehouse became inoperative at a time when qualified repair personnel were not immediately available, with the present system it would be feasible to provide a substitute base radio or base radios, for example, as indicated at 52D1 located at table level or the like.

With the present system, the base radio stations do not necessarily forward data communications received from a given terminal to a particular host. For example, hand-held terminal 12-2 may request a path to printer P2, and such a path may be created via base stations 52D1 and 52C. Station 52C upon receipt of the message form terminal 12-2 would not transmit the message to a host but would, for example, produce the desired bar code label by means of printer P2. Further, terminal 12-2 may have provision for digitizing a voice message which might, for example, be addressed to terminal 12-1. The system as illustrated would be operable to automatically establish a suitable path for example, via stations 52D1, 52C, 52B, 52E and 12-1 for the transmission of this voice message in digital form. Successive segments of such a voice message would be stored, for example, by the terminal 12-1, and when the complete message was assembled, the segments would be synthesized into a continuous voice message for the user of terminal 12-1 e.g. by means of a speaker 1201 also useful for sending tone signals indicating valid bar code read, etc.

In accordance with the present invention, a hardware system such as illustrated in FIG. 12 may be physically laid out and then upon suitable command to one of the network controllers such as 42-2B, the entire system would be progressively automatically self-configured for efficient operation. For example, controller 40B could successively try its communications options with its output ports such as 71-73, determining for example, that host processors were coupled with ports 71 and 72, one operating on a 38.4 kilobit per second asynchronous basis and the other presenting a SNA port for the V.35 protocol at 64 kilobits per second. For example, on host, 42-1B might be a main frame computer, while the other host 42-2B might be a PS/2 type computer system. The controller 40B having thus automatically configured itself so as to be compatible with the devices connected to ports 71 and 72, could proceed to transmit via port 73 a suitable inquiry message to the network channel 56. Although a polling protocol is preferred, each of the base stations could operate, for example, on a carrier-sense multiple-access (CSMA) basis or using a busy tone protocol to respond to the inquiry message from the controller 40B, until each of the successive bases on the network had responded and identified itself. Each base, for example, would have a respective unique address identification which it could transmit in response to the inquiry message so as to establish its presence on the network.

The controller 40B could then transmit auto configure commands to the successive-bases in turn, instructing the bases to determine what peripherals and router bases such as 52D1, 52E and 52F were within the range of such base, and to report back to the controller. For example, bases such as 52C and 52F could determine the nature of peripherals P2 and P3 associated therewith so as to be able to respond to an inquiry form a terminal such as 12-2 to advise the terminal that a bar code printer, for example, was within direct RF range.

In the case of a breakdown of a component of the system such as 52D, it would merely be necessary to place a router device such as 52D1 at a convenient location and activate the unit, whereupon the unit could send out its own broadcast inquiry which, for example, could be answered by the base stations 52C and 52F, station 52C in turn, advising a relevant host or hosts of the activation of a substitute router station. Thus, the system is conveniently re-self-configured without the necessity for a technician familiar with the particular configuration procedure. As another example, where the base stations are operating utilizing spread spectrum transmission, the introduction of barriers (such as a new stack of inventory goods) to such transmission between a given base such as 52A and various terminals, could result in the base 52A contacting router 52E, for example, with a request to become active with respect to the blocked terminals.

A more detailed example of auto-configuration of the network can be found in pending U.S. patent application of Meier, et al., Ser. No. 07/968,990, filed Oct. 30, 1992, which is incorporated herein by reference.

Figure 13:
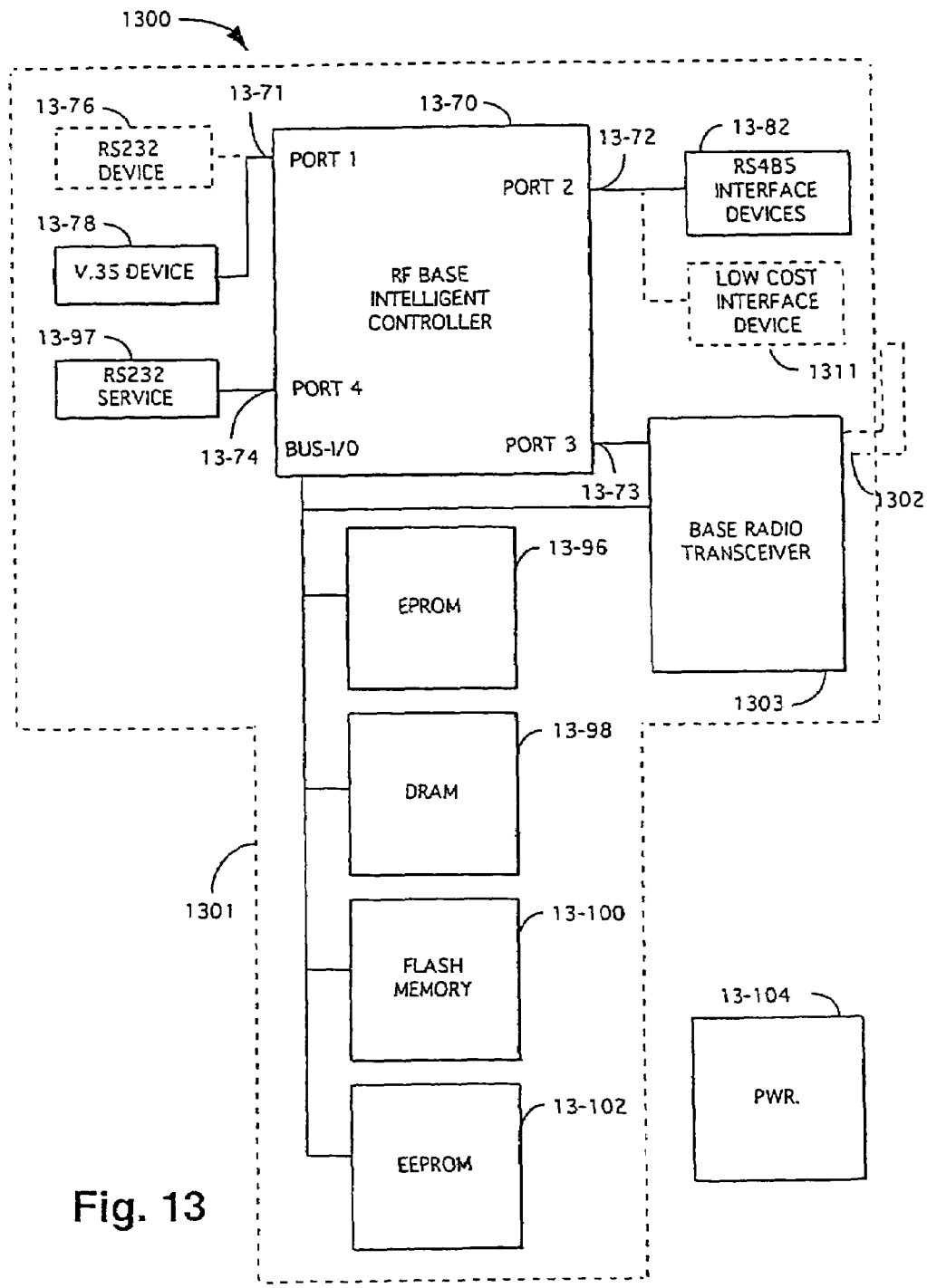
FIG. 13 shows an intelligent controller and radio base unit which unifies controller and radio components such as shown in FIG. 7 into a single housing of the size represented in FIGS. 2 and 5.

Description of FIG. 13

FIG. 13 shows an intelligent integrated controller and radio base unit 1300 which is integrated into a single housing or case 1301 corresponding to the case or housing 20 of FIG. 2. the housing 1301 may be provided with an external antenna as diagrammatically indicated at 1302 with suitable RF coupling to the radio circuitry indicated at 1303. Components 13-70 through 13-74, 13-76, 13-78, 13-96, 13-97, 13-98, 13-100, and 13-102 may correspond with the correspondingly numbered components described with reference to FIG. 4.

Supplementary Discussion

In accordance with the present disclosure, a network controller, or integrated network controller and radio unit is coupled to one or more host computers via a standard interface such as commonly encountered in practice (e.g. RS232, V. 35, Ethernet, token ring, FDDI, and so on). In this way, no specialized interface or adapter is required for the host.

Since the preferred network controller can connect to two hosts, if one host is detected to have failed, or in the event of a system crash, loss of communication link, or the like, the network controller can automatically switch to the second host. The second host may be a truly redundant system, or may be a simpler computer of the PC type (a so-called personal computer) that can simply store transactions until the main host is restored. As another example, a single host may have a second port coupled to a second port of the controller especially if a communication link failure may be a problem. For example, two ports of the network controller may be coupled by separate modems with separate phone lines, leading to separate ports of a single mainframe computer, for example an IBM3090. In a fully redundant system, two ports of a network controller may be connected respectively to two mainframe computers such as the IBM3090.

The disclosed network controller can also connect one radio network to two hosts using RS232 or V.35 ports or to many hosts using a local area network such as Ethernet, token ring, or FDDI. A number of the disclosed network controllers (for example, up to thirty-two) can be connected together to interface many hosts to a single radio network. The hand-held portable terminals in such a network can then talk to any of the hosts they choose.

For example where one port of the disclosed network controller is coupled via its RS232 interface to a mainframe computer such as the IBM3090, another of its ports may be coupled via an FDDI network with a super computer e.g. the Cray X-MP. Then mobile and/or portable terminals can access either the main frame or the super computer, or in general, any of the hosts that are connected to the network controller.

As indicated in FIG. 9, four hosts can be on one network. Referring to FIGS. 10 and 11, a multiplicity of hosts may be coupled with each local area network so as to be in communication with one or more of the disclosed network controllers. Furthermore, a single disclosed network controller can control two radio networks such as the one indicated at 50 in FIG. 3. Where each network such as 50 is limited to thirty-two devices, the number of devices is doubled with the use of two radio networks. Two such radio networks may also be utilized for the sake of redundancy, with a provision for automatic switch-over from one radio network to the second if a problem develops on the first. Two radio networks may also facilitate the use of different radio technologies in one installation.

The various multi-drop local area networks referred to herein, for example at 7-82 in FIG. 7 and as represented at 56, 56A, 56B, FIGS. 9 through 12, and at 13-82 in FIG. 13 may comprise HDLC based local area networks operating at up to 2.5 megabits per second and using biphase space encoding (FMO) for clock recovery from data.

The components. 86 and 94, FIG. 4, and component 13-11, FIG. 13, provides a low-cost base radio interface using three pairs of twisted conductors. One pair provides a bidirectional RS485 data line. Another pair is used for the clock and has an RS422 electrical configuration, and is one directional from the radio to the controller. The third twisted pair is also RS422 and is used to communicate from the controller to the radio transceiver to effect mode selection.

Since it is advantageous to operate the network and router RF transceiver units so as to be compatible with existing mobile data collection terminals such as shown in Appendix D1 et seq., a preferred mode of operation is based on the RTC protocol as disclosed in the aforementioned incorporated Mahany and Sojka patents and the following applications:

(1) U.S. Ser. No. 07/389,727 filed Aug. 4, 1989, now issued as U.S. Pat. No. 5,070,536 on Dec. 3, 1991.

(2) European Published Patent Application EPO 353759 published Feb. 7, 1990.

(3) U.S. Ser. No. 07/485,313 filed Feb. 26, 1990.

The disclosures of applications (1), (2) and (3) are hereby incorporated herein by reference in their entirety.

Figure 5:
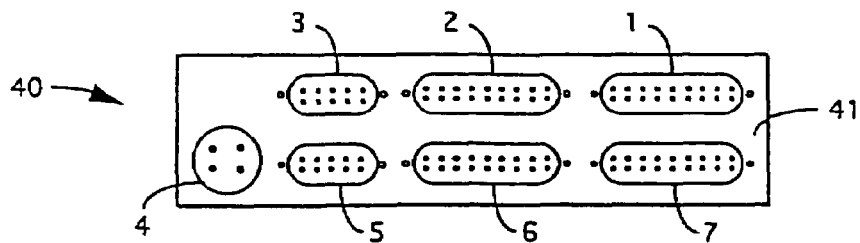
FIG. 5 is a rear elevation view of the invention.

An aspect of the invention resides in the provision of a network controller having port means selectively configurable for coupling in first mode with network RF transceiver units at a relatively high data rate such as 100 kilobits per second or higher, and for coupling in a second mode with network transceiver units at a relatively low data rate such as about twenty kilobits per second. Preferably a single port means such as 2, 3, or 5, 6, FIG. 5, can be software configured to interface selectively in the first mode or in the second mode. It is presently less expensive to use multiple connectors per port rather than a single 37-pin connector for example.

Where a network controller such as 40 operates two high data rate networks, for example, one network of RF base transceivers could operate with the RTC protocol, and the second network could operate according to a different protocol such as that disclosed in pending application Ser. No. 07/660,618 filed on or about Feb. 25, 1991,in its entirety. It will be apparent that many modifications and variations may be effected without departing from the scope of the teachings and concept of the present disclosure.

Figure 14:
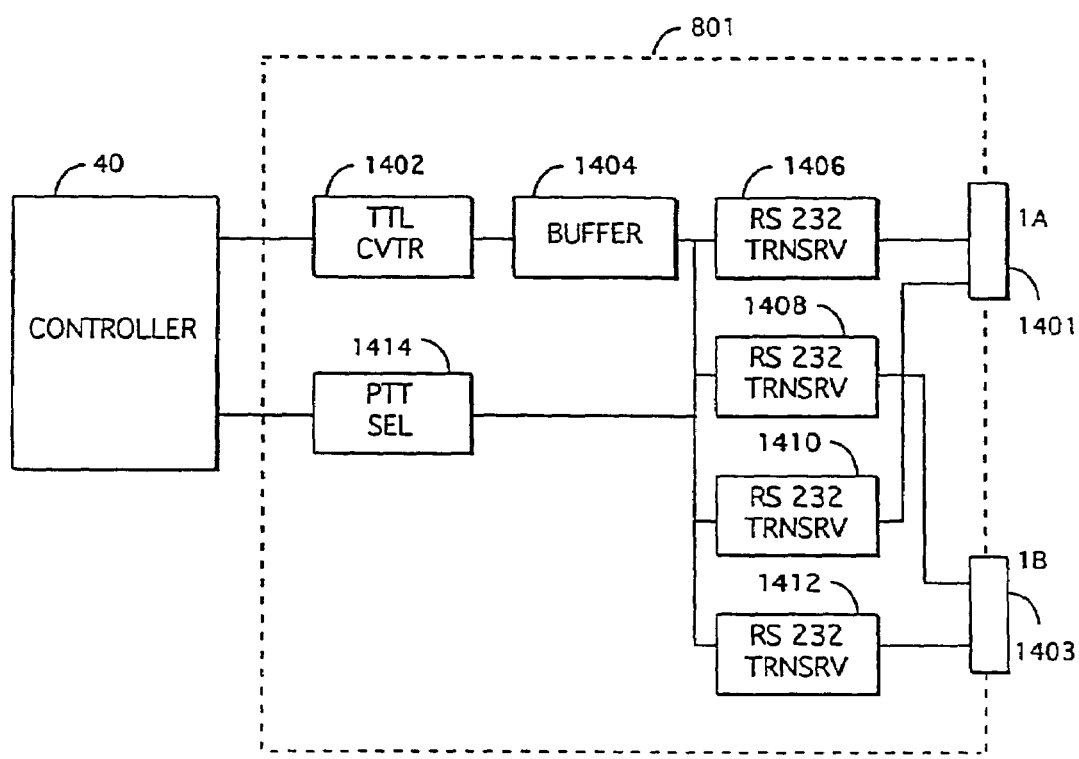
FIG. 14 shows a diagrammatic illustration of the signal processing for two of four paiis of communication ports of the multiple base adapter of the RF data collection system illustrated in FIG. 8.
Figure 15:
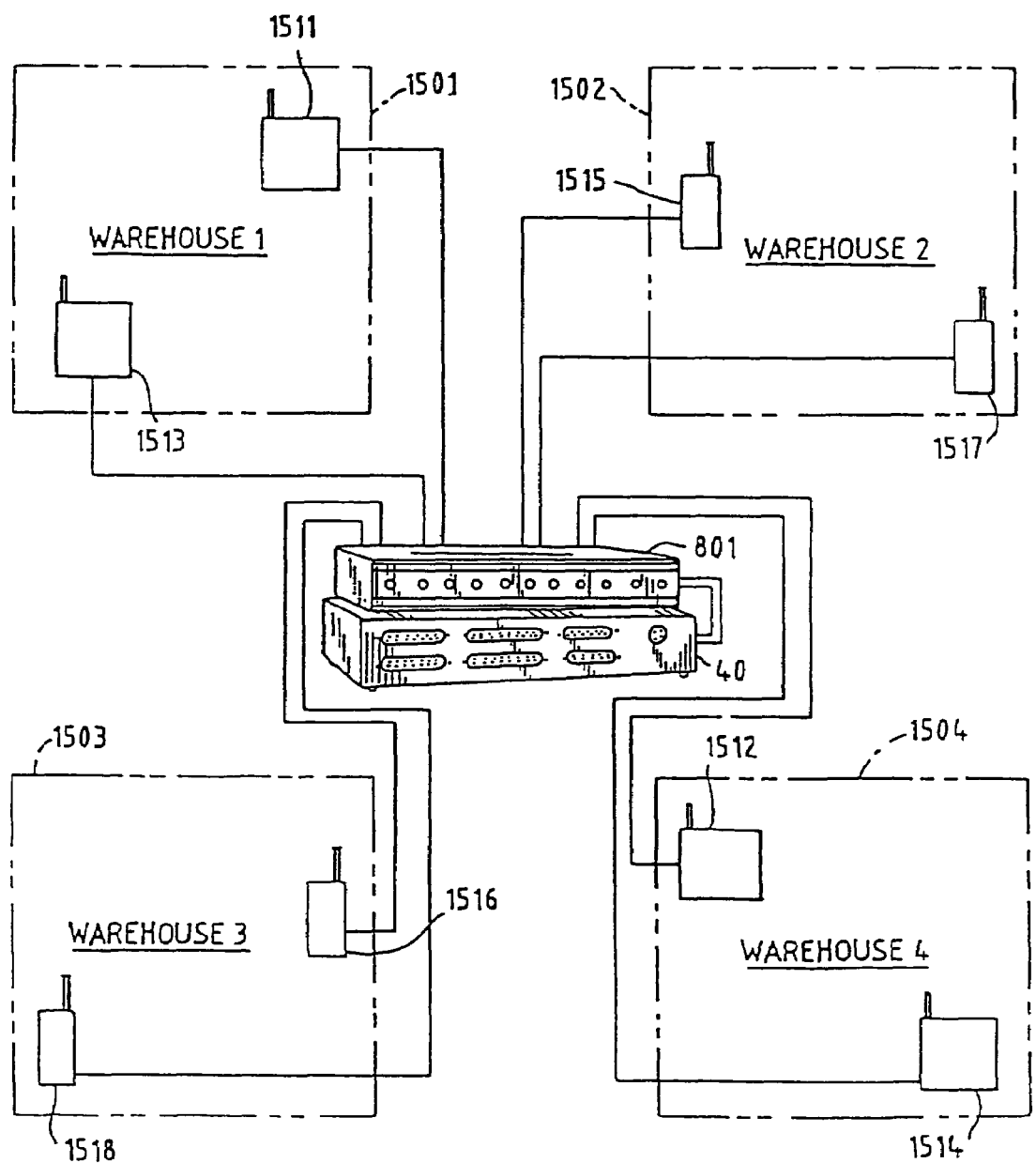
FIG. 15 is a diagram of parts of an RF data collection system utilizing a network controller according to FIGS. 2-6 and a multiple base adapter according to FIG. 14, with eight base transceiver units coupled to the multiple base adapter.

Description of FIGS. 14 and 15

FIG. 14 is a block diagram of the circuitry for one pair of communication ports 1401 and 1403 of adapter 801 (FIG. 8) for use in coupling to base transceiver units. Three additional pairs of communication parts for coupling to six additional base transceiver units are provided in the preferred embodiment of adapter 801 as exemplified by the MBA3000 Multiple Base Adapter further described in Appendix A. It is to be understood that the circuit components coupled to each additional pair of communication ports of adapter 801 is identical to that shown for first port pair IA/LA, that is ports 1401 and 1403 of FIG. 14. The adapter 801 provides means for connecting the controller 40 (FIG. 8) at its port 73 to a multiplicity of radio base units illustrated in FIG. 8 as, for example, 811, 812, 813, 814, including in selected pairs. In the preferred embodiment of adapter 801, up to eight radio base units may be coupled through use of adapter 801 to a network controller 40, to be controlled by controller 40 in selected pairs thereof. The controller 40 may control the radio base units such as 811, 812, 813, 814, (FIG. 8) in simulcast mode, that is, with all base radios interrogating mobile transceiver units such as 821, 833, and 834 of FIG. 8 simultaneously, or with the base units being employed in pairs to interrogate the mobile transceiver units.

Referring again to FIG. 14, the network controller 40 provides transmit data and baud rate select signals to adapter 801. Within adapter 801, the controller outputs are converted to TTL levels by TTL converter 1402 and they are then provided to buffer 1404 which provides the signals to paired RS232 transceivers 1406 and 1408, and to paired RS422 transceivers 1410 and 1412 which deliver the converted signals to ports 1401 and 1403 respectively. By this means, the controller's output signals are provided to a pair of output ports 1401 and 1403 in both RS232 and RS422 interface at the same time. An additional three output-port-pairs are provided which may be denominated 2A/2B, 3A/3B and 4A/4B, which ports are controlled and operated identically to ports 1A/1B identified in FIG. 14 as ports 1401 and 1402. The RS232 transceivers 1406 and 1408 and RS422 transceivers 1410 and 1412 and ports 1401 and 1403 are illustrative of all circuitry coupled to port pairs of adapter 801.

Similarly, signals provided to adapter 801 by base radios coupled to the output port pairs, e.g. ports 1401 and 1403 of FIG. 14, are first converted to TTL levels by the RS232 transceivers 1406 and 1408 or by the RS422 transceivers 1410 and 1412, depending upon which interface is presented by a pair of base radios at port 1401 and 1403. The signals provided to adapter 801 are then forwarded by the transceivers 1406 and 1408 or 1410 and 1412 at TTL levels to controller 40. A selection unit 1414 provides a push-to-talk selection signal to the RS232 transceivers 1406 and 1408 and to the RS422 transceivers 1410 and 1412 to provide PTT selection signals at ports 1401 and 1403 in both RS232 and RS422 format. It is to be understood that similar selection units are associated with remaining port pairs 2A/2B, 3A/3B. 4A/4B so that the ports may be independently operated.

The adapter 801 of FIG. 8 is exemplified by the MBA3000 multiple base adapter unit manufactured by the NORAND Corporation of Cedar Rapids, Iowa as shown in Appendix A. Because of the operation of the MBA3000 multiple base adapter by dual methods in either RS232 or RS422 signal environments, the MBA3000 may be incorporated into systems having existing installed base radios which present only an RS232 interface or it may be incorporated into systems having base radios some of which operate at RS422 and some at RS232.

FIG. 15 illustrates a preferred arrangement of controller 40 and adapter 801 when used in an environment with multiple base radios in multiple warehouse environments. Controller 40 is coupled to adapter 801 which is coupled to paired bases 1511, 1512; 1513, 1514; 1515, 1516; and 1517, 1518; which are located in warehouses 1501, 1502, 1503 and 1504. By geographical separation in warehouse 1501, for example, base radios 1511 and 1513 provide substantial coverage of warehouse 1501 such that a mobile transceiver being used within warehouse 1501 would be communicated with by either base radio 1511 or 1513. By the use of adapter 801, controller 40 may cause interrogation simultaneously by base radios 1511, 1512, 1513, 1514, 1515, 1516, 1517, 1718, or it may cause sequential interrogation by radio pairs 1511/1512, 1513/1514, 1515/1516, or 1517/1518 in succession. When a mobile transceiver responds by RF communication means with a base radio, e.g. base radio 1511, the response is transmitted by base radio 1511 through coupling 1521 to adapter 801 which automatically converts the incoming response to RS232 interface as necessary, to make it suitable for reception by controller 40.

Through a system as exemplified in FIG. 15, data collection from a number of roving mobile transceivers may be initiated by a network controller 40 through a four-warehouse environment. When base transceiver units 1511 and 1512 have been unsuccessful in establishing communication with the desired mobile transceiver unit, controller 40 will then cause bases 1513 and 1514 to attempt communication and if bases 1513 and 1514 are unsuccessful, controller 40 will proceed through the other base radio pairs, namely 1515/1516 and 1517/1518, as needed, to establish communication with the desired mobile transceiver unit. Details regarding base transceiver units 1511, 1512, 1513, and 1514 are found in Appendix B. Details regarding base transceiver units 1515, 1516, 1517, and 1518 are found in Appendix D.

The adapter 801 is provided to operate in either simulcast or sequential mode. In the normal or simulcast mode, adapter 801 allows the use of one to eight bases, where the bases are configured as four pairs of two bases. In this mode the adapter 801 simulcasts to a single base pair at a time and the four sets of base pairs are selected using a dynamic time-division multiplexing method. The user can configure the adapter 801 to use any of the eight base ports, using simulcasting or time-division multiplexing to best advantage.

There are two sets of base transceiver units, referred to as set A (identified as 1A, 2A, 3A, and 4A) and set B (identified as 1B, 2B, 3B, and 4B). Within a set, the base transceiver units are selected by time-division multiplexing.

It can be seen in FIG. 15, that there are four pairs of base transceiver units defined as pairs 1A/1B, 2A/2B, 3A/3B, 4A/4B. Each base transceiver unit of a base pair is simulcasted to at the same time.

The hardware of the adapter 801 allows the selection of the base pairs (pair 1A/1B through 4A/4B) using control lines from the controller 40. Adapter 801 transmits to both base transceiver units of a base pair at the same time and receives independently from each base simultaneously.

The use of adapter 801 allows an extension of the number of bass transceiver units that can be used in a facility to allow for adequate coverage, it is important to understand how the base transceiver units operate when simulcasting is used, and when time-division multiplexing is used.

The adapter 801 distributes signals transmitted by controller 40 to base transceiver pairs at the same time, so if there is an overlap in the coverage for the two base transceiver units, there may be some interference. The amount of interference depends on the relative signal strengths; if the strength is similar in one spot the chance of interference is larger that if the signal strengths are different. This type of interference could be avoided in some configurations by splitting coverage areas of pairs of base transceiver units. Another method of covering the overlap area is to place another base (not one of the base pairs) to cover the overlap area. The radio signals from the mobile transceiver unit may be picked up fully or partially by either or both base transceiver units of a given pair. However the adapter 801 first tries to receive from one base transceiver unit, for example base 1511, and if unsuccessful, it then switches to try to receive from a second base transceiver unit, for example base transceiver unit 1513. If the information is successfully received from the first base transceiver unit, the information from the second base transceiver unit is ignored. Thus the controller assures data does not get sent to the host data processor in duplicate.

The user may couple from one to eight base transceiver units to the adapter 801 and can then configure those base transceiver units as required to meet the installation's needs. Any combination of ports of the adapter 801 can be used. Thus the user can take advantage of the ability to simulcast or sequentially (via time-division multiplexing) access the base transceiver units 1511, 1512, 1513, 1514, 1515, 1516, 1517, and 1518.

The following Appendix E provides an exemplary computer program listing for preferred control instruction for the system disclosed herein.

Multipath Fading and Data Packet Size Parameters.

In a preferred embodiment, the data (or messages) to be sent through the RF communication link is segmented into a plurality of DATA packets and is then transmitted. Upon receipt, the DATA packets are reassembled for use or storage. Data segmentation on the RF link provides better communication channel efficiency by reducing the amount of data loss in the network. For example, because collisions between transmissions on an RF link cannot be completely avoided, sending the data in small segments results in an overall decrease in data loss in the network, i.e., only the small segments which collide have to be re-sent.

Similarly, choosing smaller data packets for transmission also reduces the amount of data loss by reducing the inherent effects of perturbations and fluctuations found in RF communication links. In particular, RF signals are inherently subject to what is termed "multi-path fading". A signal received by a receiver is a composite of all signals that have reached that receiver by taking all available paths from the transmitter. The received signal is therefore often referred to as a "composite signal" which has a power envelope equal to the vector sum of the individual components of the multi-path signals received. If the signals making up the composite signal are of amplitudes that add "out of phase", the desired data signal decreases in amplitude. If the signal amplitudes are approximately equal, an effective null (no detectable signal at the receiver) results. This condition is termed "fading".

An data communication system using segmentation can be found in a pending application of Steven E. Koenck, et al., U.S. Ser. No. 07/305,302 filed Jan. 31, 1989, which is incorporated herein by reference in its entirety. Specific reference is made to Appendix A thereof.

Normally changes in the propagation environment occur relatively slowly, i.e., over periods of time ranging from several tenths ($\frac{1}{10}$'s) of seconds to several seconds. However, in a mobile RF environment, receivers (or the corresponding transmitters) often travel over some distance in the course of receiving a message. Because the signal energy at each receiver is determined by the paths that the signal components take to reach that receiver, the relative motion between the receiver and the transmitter causes the receiver to experience rapid fluctuations in signal energy. Such rapid fluctuations can result in the loss of data if the amplitude of the received signal falls below the sensitivity of the receiver.

Over small distances, the signal components that determine the composite signal are well correlated, i.e., there is a small probability that a significant change in the signal power envelope will occur over the distance. If a transmission of a data packet can be initiated and completed before the relative movement between the receiver and transmitter exceeds the "small distance", data loss to fading is unlikely to occur. The maximum "small distance" wherein a high degree of correlation exists is referred to hereafter as the "correlation distance".

As expressed in wavelengths of the carrier frequency, the correlation distance is one half ($\frac{1}{2}$) of the wavelength, while a more conservative value is one quarter ($\frac{1}{4}$) of the wavelength. Taking this correlation distance into consideration, the size of the data packet for segmentation purposes can be calculated. For example, at 915 MHz (a preferred RF transmission frequency), a quarter wavelength is about 8.2 centimeters. A mobile radio moving at ten (10) miles per hour, or 447 centimeters per second, travels the quarter wavelength in about 18.3 milliseconds. In such an environment, as long as the segment packet size remains well under 18.3 milliseconds, significant signal fluctuations during the duration of a packet transmission is unlikely. In such an preferred embodiment, five (5) millisecond data packet segments are chosen which provides a quasi-static multipath communication environment.

The faster the relative movement between a transmitter and a receiver the greater the effect of fading, and, therefore, the smaller the data segment should be. Similarly, if the relative movement is slower, the data segment can be larger.

Slower fading effects which might be experienced between stationary transceivers in an office building due to the movement of people, mail carts, and the like. In a typical application of the present invention, the RF transceiver of a mobile unit may be secured with a bar-code scanner such as a deflected laser beam bar-code scanner or an instant CCD bar-code scanner. In such an example, the bar code data could be transmitted to the base station as the RF transceiver and a scanner device were being jointly transported by a vehicle (e.g. a forklift truck) to another site, or the RF transceiver and a scanner, e.g. as a unitary hand-held device, could be carried by the operator to another site as the bar code data was being transmitted to the base station. In such situations, fading is more pronounced.

If fading does not pose a problem on a given network, the overhead associated with segmentation, hand-shaking and reconstruction may not be justifiable. However, where fading exists, such overhead may be required.

In many communication environments, the degree of fading effects varies dramatically both from time to time and from installation to installation. In the preferred embodiment, transmitters and receivers communicate using an optimal data segment size parameter by adapting the size to conform to the communication environment of the network at any given time. For example, if a receiver detects repeated faulty transmissions, the data segment size parameter might be incrementally reduced (under the assumption that fading caused the faults) until the data throughput reaches an optimal level. Similarly, the size of the data segment can be reduced based on a measured indication of the degree of fading in the network.

One example of a receiver making such a measurement of fading can be found in the abandoned patent application of Ronald L. Mahany, U.S. Ser. No. 07/485,313, filed Feb. 26, 1990, which is incorporated herein by reference. Specifically, in that reference, a received signal strength indicator (RSSI) circuit is found in the receiver. The RSSI circuit samples the signal strength of a transmission. If the signal strength samples are evaluated in sequence and the trend analyzed, the degree of fading can be measured. If the signal strength samples decrease in value, it is likely that fading is present in the network. However, just because fading exists does not require segmentation. Only if fading causes the signal strength to drop below the level of the receiver's sensitivity is segmentation required.

A fixed threshold value that is located a safe margin above the receiver's sensitivity is used to determine whether to change the data segment size. If a trend in signal strength shows values falling below the threshold, the data segment size is decreased. If the threshold level is never reached, the segment size might be increased. In addition, the trend associated with a group of signal strength samples can, be used to predict the optimal data packet size—the intersection of the signal strength samples with the threshold defines a segment length that, with a safe margin, can be used effectively used with the current degree of fading.

After receiving a data segment, the receiver sends to the transmitter indications regarding: 1) whether the data segment was received without fault; and 2) what the new optimal segment size should be. The transmitter responds by adjusting the data segment size and then sending the next segment. As can be appreciated, the data segments are adapted based on the previous transmission. Instead of adjusting on the basis of the reception of a single data segment (the previous transmission), other techniques for adjustment are contemplated. For example, the transmitter may also utilize a threshold window (or weighted averaging), inside of which the segment size will not be changed. Only if the requested change by the receiver falls outside of the threshold window will the segment size change. Similarly, the receiver might also utilize such a window—only requesting a change when the newly forecasted, optimal segment size falls outside of the window.

Direct-Sequence Spread Spectrum Parameters.

As described above, the network controller provides an interface to both the older generation UHF radio transceivers and newer generation spread spectrum transceivers. A spread spectrum broadcasting system uses a sequential pseudo-noise signal to spread a signal that is in a relatively narrow band over a wider range of frequencies. It is the subject of standards issued by the Federal Communications Commission (FCC) that provide usable spectrum at low power levels for communication in limited areas such as warehouses, office buildings, and the like. The use of spread-spectrum techniques minimizes interference with others using the same channels in the spectrum.

A transmitter using direct-sequence spread spectrum transmission uses a spreading-code of a higher frequency than that of the data rate to encode the data to be sent. This higher frequency is achieved by increasing the chip clock rate (wherein each chip constitutes an element of the spreading-code). Using the same spreading code, the receiver decodes the received signal while ignoring minor faults which occurred in transmission, providing noise immunity and multipath signal rejection. The frequency and length of the spreading-code can be varied to offer more or less multipath signal rejection or noise immunity. Although it may result in improved communication, increasing the frequency or length of the spreading-code requires additional overhead which may not be justifiable unless necessary.

Frequency-Hopping Spread Spectrum Parameters.

Frequency-hopping is the switching of transmission frequencies according to a sequence that is fixed or pseudo-random and that is available to both the transmitter and receiver. Adaptation to the communication environment via an exchange in frequency-hopping operating parameters is possible, for example, via selective control of the hopping rate or through the use of coding or interleaving. The greater the degree of frequency selectivity of the fading envelope (i.e., when fading is significant only over a portion of the spectrum of hopping frequencies), the greater the benefit of such adaptation.

Particularly, a parameter indicating the hopping rate can be varied to minimize the probability that the channel characteristics will detrimentally change during the course of a communication exchange. To vary the hopping rate is to vary the length of a hopping frame. Although multiple data (or message) exchanges per hopping frame is contemplated, the preferred hopping frame consists of a single exchange of data. For example, in a polling environment, the hopping frame might consist of: 1) a base station transmitting a polling packet to a roaming terminal; 2) the roaming terminal transmitting data in response; and 3) the base station responding in turn by transmitting an acknowledge packet. Each hopping frame exchange occurs at a different pseudo-randomly chosen frequency.

For optimization, the hop frame length is adjusted to be as long as possible, while remaining shorter than the coherence time of the channel by some safety margin. Although such adjustment does not eliminate the effects of fading, it increases the probability that the characteristics of the channel will remain consistent during each hopping frame. Thus, in the preferred embodiment, if the polling packet transmission is successfully received, the probability of successful receipt of the data (or message) and acknowledge is high.

Another parameter for changing frequency-hopping performance is that of coding. Coding on the channel for error correction purposes can be selectively used whenever the probability of data or message loss due to fading is high. In particular, coding methods which provide burst error correction, e.g., Reed-Solomon coding, can be applied if the hop length is likely to exceed the coherence time of the channel. Such coding methods allow some portion of the data to be lost and reconstructed at the expense of a 30-50% reduction in throughput. The operating parameter for coding indicates whether coding should be used and, if so, the type of coding to be used.

An operating parameter indicating whether interleaving should be used also helps to optimize the communication channel. Interleaving involves breaking down the data into segments which are redundantly transmitted in different hopping frames. For example, in a three segment exchange, the first and second segments are sequentially combined and sent during a first hopping frame. In a subsequent hopping frame, the second and third segments are combined and sent. Finally, the third and first segments are sequentially combined and transmitted in a third hopping frame. The receiving transceiver compares each segment received with the redundantly received segment to verify that the transmission was successful. If errors are detected, further transmissions must be made until verification is achieved. Once achieved, the transceiver reconstructs the data from the segments.

Other methods of interleaving are also contemplated. For example, a simpler form of interleaving would be to sequentially send the data twice without segmentation on two different frequencies (i.e., on two successive hops).

As can be appreciated, interleaving provides for a redundancy check but at the expense of data or message throughput. The interleaving parameter determines whether interleaving is to be used and, if so, the specific method of interleaving.

In addition, any combination of the above frequency-hopping parameters might interact to define an overall operating configuration, different from what might be expected from the sum of the individual operating parameters. For example, selecting interleaving and coding, through their respective parameters, might result in a more complex communication scheme which combines segmentation and error correction in some alternate fashion.

Source Encoding Parameters (For Narrowband Applications).

In the United States, data communication equipment operating in the ultra-high frequency (UHF) range under conditions of frequency modulation (FM) is subject to the following limitations.

(1) The occupied band width is sixteen kilohertz maximum with five kilohertz maximum frequency deviation.

(2) The channel spacing is 25 kilohertz. This requires the use of highly selected filtering in the receiver to reduce the potential for interference from nearby radio equipment operating on adjacent channels.

(3) The maximum output power is generally in the range of ten to three hundred watts. For localized operation in a fixed location, however, transmitter power output may be limited to two watts maximum, and limitations may be placed on antenna height as well. These restrictions are intended to limit system range so as to allow efficient re-use of frequencies.

For non-return to zero (NRZ) data modulation, the highest modulating frequency is equal to one half the data rate in baud. Maximum deviation of five kilohertz may be utilized for a highest modulation frequency which is less than three kilohertz, but lower deviations are generally required for higher modulation frequencies. Thus, at a data rate of ten thousand baud, and an occupied bandwidth of sixteen kilohertz, the peak FM deviation which can be utilized for NRZ data may be three kilohertz or less.

Considerations of cost versus performance tradeoffs are the major reason for the selection of the frequency modulation approach used in the system. The approach utilizes shaped non-return-to-zero (NRZ) data for bandwidth efficiency and non-coherent demodulation using a limiter-discriminator detector for reasonable performance at weak RF signal levels. However, the channel bandwidth constraints limit the maximum data "high" data rate that can be utilized for transmitting NRZ coded data. Significant improvements in system throughput potential can be realized within the allotted bandwidth by extending the concept of adaptively selecting data rate to include switching between source encoding methods. The preferred approach is to continue to use NRZ coding for the lower system data rate and substitute partial response (PR) encoding for the higher rate. The throughput improvements of a NRZ/PR scheme over an NRZ/NRZ implementation are obtained at the expense of additional complexity in the baseband processing circuitry. An example of a transceiver using such an approach can be found in the previously incorporated patent application of Ronald L. Mahany, U.S. Ser. No. 07/485,313, filed Feb. 26, 1990.

Partial response encoding methods are line coding techniques which allow a potential doubling of the data rate over NRZ encoding using the same baseband bandwidth. Examples of PR encoding methods include duobinary and modified duobinary encoding. Bandwidth efficiency is improved by converting binary data into three level, or pseudo-ternary signals. Because the receiver decision circuitry must distinguish between three instead of two levels, there is a signal to noise (range) penalty for using PR encoding. In an adaptive baud rate switching system, the effects of this degradation are eliminated by appropriate selection of the baud rate switching threshold.

Since PR encoding offers a doubling of the data rate of NRZ encoded data in the same bandwidth, one possible implementation of a NRZ/PR baud rate switching system would be a 4800/9600 bit/sec system in which the low-pass filter bandwidth is not switched. This might be desirable for example if complex low-pass filters constructed of discrete components had to be used. Use of a single filter could reduce circuit costs and printed circuit board area requirements. This approach might also be desirable if the channel bandwidth were reduced below what is currently available.

The preferred implementation with the bandwidth available is to use PR encoding to increase the high data rate well beyond the 9600 bit/sec implementation previously described. An approach using 4800 bit/sec NRZ encoded data for the low rate thereby providing high reliability and backward compatibility with existing products, and 16K bit/sec PR encoded transmission for the high rate may be utilized. The PR encoding technique is a hybrid form similar to duobinary and several of its variants which has been devised to aid decoding, minimize the increase in hardware complexity, and provide similar performance characteristics to that of the previously described 4800/9600 bit/sec implementation. While PR encoding could potentially provide a high data rate of up to 20K bit/sec in the available channel bandwidth, 16K bit/sec is preferable because of the practical constraints imposed by oscillator temperature stability and the distortion characteristics of IF bandpass filters.

Exchanging Parameters.

All of the above referenced parameters must be maintained in local memory at both the transmitter and the receiver so that successful communication can occur. To change the communication environment by changing an operating parameter requires both synchronization between the transceivers and a method for recovering in case synchronization fails.

In a preferred embodiment, if a transceiver receiving a transmission (hereinafter referred to as the "destination") determines that an operating parameter needs to be changed, it must transmit a request for change to the transceiver sending the transmission (hereinafter the "source"). If received, the source may send an first acknowledge to the destination based on the current operating parameter. Thereafter, the source modifies its currently stored operating parameter, stores the modification, and awaits a transmission from the destination based on the newly stored operating parameter. The source may also send a "no acknowledge" message, rejecting the requested modification.

If the first acknowledge message is received, the destination modifies its currently stored operating parameter, stores the modification, sends a verification message based on the newly stored operating parameter, and awaits a second acknowledge message from the source. If the destination does not receive the first acknowledge, the destination sends the request again. If after several attempts the first acknowledge is not received, the destination modifies the currently stored parameter, stores the modification as the new operating parameter, and, based on the new parameter, transmits a request for acknowledge. If the source has already made the operating parameter modification (i.e., the destination did not properly receive the first acknowledge message), the destination receives the request based on the new parameters and responds with a second acknowledge. After the second acknowledge is received, communication between the source and destination based on the newly stored operating parameter begins.

If the destination does not receive either the first or the second acknowledge messages from the source after repeated requests, the destination replaces the current operating parameter with a factory preset system-default (which is also loaded upon power-up). Thereafter, using the system-default, the destination transmits repeated requests for acknowledge until receiving a response from the source. The system-default parameters preferably define the most robust configuration for communication.

If after a time-out period the second request for acknowledge based on the newly stored operating parameters is not received, the source restores the previously modified operating parameters and listens for a request for acknowledge. If after a further time-out period a request for acknowledge is not received, the source replaces the current operating parameter with the factory preset system-default (which is the same as that stored in the destination, and which is also loaded upon power-up). Thereafter, using the common system-default, the source listens for an acknowledge request from the destination. Once received, communication is re-established.

Other synchronization and recovery methods are also contemplated. For example, instead of acknowledge requests originating solely from the destination, the source might also participate in such requests. Similarly, although polling is the preferred protocol for carrying out the communication exchanges described above, carrier-sense multiple-access (CSMA) or busy tone protocols might also be used.

In addition, Appendix F provides a list of the program modules which are found in Appendix G. These modules comprise another exemplary computer program listing of the source code ("C" programming language) used by the network controllers and intelligent base transceivers of the present invention. Note that the term "AMX" found in Appendices F and G refers to the operating system software used. "AMX" is a multitasking operating system from KADAK Products, Ltd., Vancouver, B.C., Canada.

As is evident from the description that is provided above, the implementation of the present invention can vary greatly depending upon the desired goal of the user. However, the scope of the present invention is intended to cover all variations and substitutions which are and which may become apparent from the illustrative embodiment of the present invention that is provided above, and the scope of the invention should be extended to the claimed invention and its equivalents. It is to be understood that many variations and modifications may be effected without departing from the scope of the present disclosure.

What is claimed is:

1. A communication system comprising:
a first wireless transceiver responsive to an evaluation of a communication channel by a second wireless transceiver, said first wireless transceiver operable to adjust a size of a data packet to be transmitted to the second wireless transceiver based on the evaluation of the communication channel by the second wireless transceiver;
where the first wireless transceiver is further operable to:
measure signal strength of a received signal;
determine a desired packet size for packets transmitted from the second wireless transceiver to the first wireless transceiver based, at least in part, on the measured signal strength; and
transmit a message comprising information indicating the determined desired packet size.

2. The communication system of claim 1, where the first wireless transceiver is operable to:
determine, based at least in part on analysis of a received signal, a desired data rate to be utilized for packets transmitted to the first wireless transceiver; and
transmit a message comprising information indicating the determined desired data rate.

3. The communication system of claim 1, where the first wireless transceiver is operable to:
determine, based at least in part on analysis of a received signal, a desired spreading code length to be utilized for packets transmitted to the first wireless transceiver; and
transmit a message comprising information indicating the determined desired spreading code length.

4. The communication system of claim 1, where the first wireless transceiver is operable to:
determine, based at least in part on analysis of a received signal, a desired type of error correction coding to be utilized for packets transmitted to the first wireless transceiver; and
transmit a message comprising information indicating the determined desired type of error correction coding.

5. The communication system of claim 1, where the first wireless transceiver is operable to:
determine, based at least in part on analysis of a received signal, whether error correction coding is desired for packets transmitted to the first wireless transceiver; and
transmit a message comprising information indicating whether error correction coding is desired.

6. The communication system of claim 1, where the first wireless transceiver is operable to communicate with a plurality of wireless transceivers concurrently using frequency-hopping in a time-multiplexed manner.

7. The communication system of claim 1, where the first wireless transceiver is a mobile terminal.

8. The communication system of claim 1, where the first wireless transceiver is operable to determine the desired packet size for packets transmitted to the first wireless transceiver based, at least in part, on detected errors.

9. The communication system of claim 1, where the first wireless transceiver is operable to determine the desired packet size for packets transmitted to the first wireless transceiver based, at least in part, on a plurality of signal strength measurements.

10. The communication system of claim 1, where the first wireless transceiver is operable to determine the desired packet size for packets transmitted to the first wireless transceiver based, at least in part, on detected fading.

11. The communication system of claim 1, where the first wireless transceiver is operable to determine the desired packet size for packets transmitted to the first wireless transceiver utilizing a threshold window for said determination.

12. The communication system of claim 1, where the first wireless transceiver is operable to determine the desired packet size for packets transmitted to the first wireless transceiver based, at least in part, on a weighted average of a plurality of signal strength measurements.

13. The communication system of claim 1, wherein the first wireless transceiver is operable to communicate with a plurality of different types of communication networks utilizing a plurality of different respective communication protocols.

14. The communication system of claim 1, where the first wireless transceiver is operable to select a size of a data packet to be transmitted to the second wireless transceiver based, at least in part, on a message received from the second wireless transceiver, the received message comprising information indicating a packet size desired by the second wireless transceiver for packets transmitted to the second wireless transceiver.

15. The communication system of claim 14, where the first wireless transceiver is operable to select, at the discretion of the first wireless transceiver, the size of the data packet to be transmitted to the second wireless transceiver.

16. A communication system, comprising:
a first wireless transceiver operable to:
receive at least one transmission from a second wireless transceiver, and adjust a size of a data packet to be transmitted to the second wireless transceiver based on the at least one transmission received from the second wireless transceiver;
measure signal strength of a received signal;
determine a desired packet size for packets transmitted from the second wireless transceiver to the first wireless transceiver based, at least in part, on the measured signal strength; and
transmit a message comprising information indicating the determined desired packet size.

17. The communication system of claim 16, where the first wireless transceiver is operable to:
determine, based at least in part on analysis of a received signal, a desired data rate to be utilized for packets transmitted to the first wireless transceiver; and
transmit a message comprising information indicating the determined desired data rate.

18. The communication system of claim 16, where the first wireless transceiver is operable to:
determine, based at least in part on analysis of a received signal, a desired spreading code length to be utilized for packets transmitted to the first wireless transceiver; and
transmit a message comprising information indicating the determined desired spreading code length.

19. The communication system of claim 16, where the first wireless transceiver is operable to:
determine, based at least in part on analysis of a received signal, a desired type of error correction coding to be utilized for packets transmitted to the first wireless transceiver; and
transmit a message comprising information indicating the determined desired type of error correction coding.

20. The communication system of claim 16, where said first wireless transceiver is operable to:
determine, based at least in part on analysis of a received signal, whether error correction coding is desired for packets transmitted to the first wireless transceiver; and
transmit a message comprising information indicating whether error correction coding is desired.

21. The communication system of claim 16, where the first wireless transceiver is operable to communicate with a plurality of wireless transceivers concurrently using frequency-hopping in a time-multiplexed manner.

22. The communication system of claim 16, where the first wireless transceiver is a mobile terminal.

23. The communication system of claim 16, where the first wireless transceiver is operable to determine the desired packet size for packets transmitted to the first wireless transceiver based, at least in part, on detected errors.

24. The communication system of claim 16, where the first wireless transceiver is operable to determine the desired packet size for packets transmitted to the first wireless transceiver based, at least in part, on detected fading.

25. The communication system of claim 16, where the first wireless transceiver is operable to determine the desired packet size for packets transmitted to the first wireless transceiver utilizing a threshold window for said determination.

26. The communication system of claim 16, where the first wireless transceiver is operable to determine the desired packet size for packets transmitted to the first wireless transceiver based, at least in part, on a weighted average of a plurality of signal strength measurements.

27. The communication system of claim 16, wherein the first wireless transceiver is operable to communicate with a plurality of different types of communication networks utilizing a plurality of different respective communication protocols.

28. The communication system of claim 16, where the first wireless transceiver is operable to select a size of a data packet to be transmitted to the second wireless transceiver based, at least in part, on a message received from the second wireless transceiver, the received message comprising information indicating a packet size desired by the second wireless transceiver for packets transmitted to the second wireless transceiver.

29. The communication system of claim 28, wherein the first wireless transceiver is operable to select, at the discretion of the first wireless transceiver, the size of the data packet to be transmitted to the second wireless transceiver.

30. A communication system, comprising:
a first wireless transceiver; and
a second wireless transceiver,
where said first wireless transceiver is operable to:
receive at least one communication from said second wireless transceiver, and adjust a size of a data segment to be transmitted to said second wireless transceiver based on an evaluation of the at least one communication received from said second wireless transceiver;
measure signal strength of a received signal;
determine a desired packet size for packets transmitted from the second wireless transceiver to the first wireless transceiver based, at least in part, on the measured signal strength; and
transmit a message comprising information indicating the determined desired packet size.

31. The communication system of claim 30, where the first wireless transceiver is operable to:
determine, based at least in part on analysis of a received signal, a desired data rate to be utilized for packets transmitted to the first wireless transceiver; and
transmit a message comprising information indicating the determined desired data rate.

32. The communication system of claim 30, where the first wireless transceiver is operable to:
determine, based at least in part on analysis of a received signal, a desired spreading code length to be utilized for packets transmitted to the first wireless transceiver; and
transmit a message comprising information indicating the determined desired spreading code length.

33. The communication system of claim 30, where the first wireless transceiver is operable to:
determine, based at least in part on analysis of a received signal, a desired type of error correction coding to be utilized for packets transmitted to the first wireless transceiver; and
transmit a message comprising information indicating the determined desired type of error correction coding.

34. The communication system of claim 30, where said first wireless transceiver is operable to:
determine, based at least in part on analysis of a received signal, whether error correction coding is desired for packets transmitted to the first wireless transceiver; and
transmit a message comprising information indicating whether error correction coding is desired.

35. The communication system of claim 30, where the first wireless transceiver is operable to communicate with a plurality of wireless transceivers concurrently using frequency-hopping in a time-multiplexed manner.

36. The communication system of claim 30, where the first wireless transceiver is a mobile terminal.

37. The communication system of claim 30, where the first wireless transceiver is operable to determine the desired packet size for packets transmitted to the first wireless transceiver based, at least in part, on detected errors.

38. The communication system of claim 30, where the first wireless transceiver is operable to determine the desired packet size for packets transmitted to the first wireless transceiver based, at least in part, on detected fading.

39. The communication system of claim 30, where the first wireless transceiver is operable to determine the desired packet size for packets transmitted to the first wireless transceiver utilizing a threshold window for said determination.

40. The communication system of claim 30, where the first wireless transceiver is operable to determine the desired packet size for packets transmitted to the first wireless transceiver based, at least in part, on a weighted average of a plurality of signal strength measurements.

41. The communication system of claim 30, where the first wireless transceiver is operable to communicate with a plurality of different types of communication networks utilizing a plurality of different respective communication protocols.

42. The communication system of claim 30, where the first wireless transceiver is operable to select a size of a data packet to be transmitted to the second wireless transceiver based, at least in part, on a message received from the second wireless transceiver, the received message comprising information indicating a packet size desired by the second wireless transceiver for packets transmitted to the second wireless transceiver.

43. The communication system of claim 42, wherein the first wireless transceiver is operable to select, at the discretion of the first wireless transceiver, the size of the data packet to be transmitted to the second wireless transceiver.

44. A communication system, comprising:
a first wireless transceiver; and
a second wireless transceiver, where
the first wireless transceiver is responsive to an evaluation of a communication channel, the first wireless transceiver operable to adjust a size of a data segment to be transmitted to the second wireless transceiver based on the evaluation of the communication channel; and
the first wireless transceiver is further operable to:
measure signal strength of a received signal;
determine a desired packet size for packets transmitted from the second wireless transceiver to the first wireless transceiver based, at least in part, on the measured signal strength; and
transmit a message comprising information indicating the determined desired packet size.

45. The communication system of claim 44, where the first wireless transceiver is operable to:
determine, based at least in part on analysis of a received signal, a desired data rate to be utilized for packets transmitted to the first wireless transceiver; and
transmit a message comprising information indicating the determined desired data rate.

46. The communication system of claim 44, where the first wireless transceiver is operable to:
determine, based at least in part on analysis of a received signal, a desired spreading code length to be utilized for packets transmitted to the first wireless transceiver; and
transmit a message comprising information indicating the determined desired spreading code length.

47. The communication system of claim 44, where the first wireless transceiver is operable to:
determine, based at least in part on analysis of a received signal, a desired type of error correction coding to be utilized for packets transmitted to the first wireless transceiver; and
transmit a message comprising information indicating the determined desired type of error correction coding.

48. The communication system of claim 44, where the first wireless transceiver is operable to:
determine, based at least in part on analysis of a received signal, whether error correction coding is desired for packets transmitted to the first wireless transceiver; and
transmit a message comprising information indicating whether error correction coding is desired.

49. The communication system of claim 44, where the first wireless transceiver is operable to communicate with a plurality of wireless transceivers concurrently using frequency-hopping in a time-multiplexed manner.

50. The communication system of claim 44, where the first wireless transceiver is a mobile terminal.

51. The communication system of claim 44, where the first wireless transceiver is operable to determine the desired packet size for packets transmitted to the first wireless transceiver based, at least in part, on detected errors.

52. The communication system of claim 44, where the first wireless transceiver is operable to determine the desired packet size for packets transmitted to the first wireless transceiver based, at least in part, on a plurality of signal strength measurements.

53. The communication system of claim 44, where the first wireless transceiver is operable to determine the desired packet size for packets transmitted to the first wireless transceiver based, at least in part, on detected fading.

54. The communication system of claim 44, where the first wireless transceiver is operable to determine the desired packet size for packets transmitted to the first wireless transceiver utilizing a threshold window for said determination.

55. The communication system of claim 44, where the first wireless transceiver is operable to determine the desired packet size for packets transmitted to the first wireless transceiver based, at least in part, on a weighted average of a plurality of signal strength measurements.

56. The communication system of claim 44, where the first wireless transceiver is operable to communicate with a plurality of different types of communication networks utilizing a plurality of different respective communication protocols.

57. The communication system of claim 44, where the first wireless transceiver is operable to select a size of a data packet to be transmitted to the second wireless transceiver based, at least in part, on a message received from the second wireless transceiver, the received message comprising information indicating a packet size desired by the second wireless transceiver for packets transmitted to the second wireless transceiver.

58. The communication system of claim 57, where the first wireless transceiver is operable to select, at the discretion of the first wireless transceiver, the size of the data packet to be transmitted to the second wireless transceiver.

59. A communication system comprising:
a first wireless transceiver responsive to an evaluation of a communication channel by a second wireless transceiver, said first wireless transceiver operable to adjust a size of a data packet to be transmitted to the second wireless transceiver based on the evaluation of the communication channel by the second wireless transceiver;
where the first wireless transceiver is further operable to:
  detect errors in a received message;
  determine a desired packet size for packets transmitted from the second wireless transceiver to the first wireless transceiver based, at least in part, on the detected errors; and
  transmit a message comprising information indicating the determined desired packet size.

60. A communication system, comprising:
a first wireless transceiver operable to:
  receive at least one transmission from a second wireless transceiver, and adjust a size of a data packet to be transmitted to the second wireless transceiver based on the at least one transmission received from the second wireless transceiver;
  detect errors in a received message;
  determine a desired packet size for packets transmitted from the second wireless transceiver to the first wireless transceiver based, at least in part, on the detected errors; and
  transmit a message comprising information indicating the determined desired packet size.

\* \* \* \* \*

UNITED STATES PATENT AND TRADEMARK OFFICE
CERTIFICATE OF CORRECTION

PATENT NO. : 7,609,747 B2
APPLICATION NO. : 11/112634
DATED : October 27, 2009
INVENTOR(S) : Ronald L. Mahany It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1001 days.

Signed and Sealed this

Twelfth Day of October, 2010

David J. Kappos
*Director of the United States Patent and Trademark Office*